(12) United States Patent  
Nagahama et al.

(10) Patent No.: US 7,903,340 B2  
(45) Date of Patent: Mar. 8, 2011

(54) ANTI-GLARE FILM, METHOD FOR MANUFACTURING THE SAME, AND DISPLAY DEVICE USING THE SAME

(75) Inventors: Tsutomu Nagahama, Miyagi (JP); Yumi Haga, Miyagi (JP); Hitoshi Watanabe, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/783,817

(22) Filed: May 20, 2010

(65) Prior Publication Data  
US 2010/0232023 A1 Sep. 16, 2010

Related U.S. Application Data

(62) Division of application No. 12/485,663, filed on Jun. 16, 2009, now Pat. No. 7,751,121, which is a division of application No. 12/030,730, filed on Feb. 13, 2008, now Pat. No. 7,567,383.

(30) Foreign Application Priority Data

Feb. 14, 2007 (JP) ................ P2007-033855  
Dec. 28, 2007 (JP) ................ P2007-341220

(51) Int. Cl.  
    *G02B 5/02* (2006.01)  
(52) U.S. Cl. ............ 359/599; 359/613; 349/112  
(58) Field of Classification Search .......... 359/599  
See application file for complete search history.

(56) References Cited

U.S. PATENT DOCUMENTS

| 4,114,983 | A | * | 9/1978 | Maffitt et al. | ............. 359/580 |
|---|---|---|---|---|---|
| 5,963,284 | A | | 10/1999 | Jones et al. | |
| 6,829,094 | B2 | | 12/2004 | Yoshii et al. | |
| 7,446,915 | B2 | | 11/2008 | Schadt et al. | |
| 2002/0027626 | A1 | * | 3/2002 | Hiraishi et al. | ........... 349/112 |
| 2006/0001971 | A1 | | 1/2006 | Schadt et al. | |
| 2009/0310219 | A1 | * | 12/2009 | Nagahama et al. | ......... 359/493 |

FOREIGN PATENT DOCUMENTS

| EP | 1 152 286 | 11/2001 |
|---|---|---|
| JP | 2002365410 | 12/2002 |
| JP | 2004-061853 | 2/2004 |
| JP | 2004240411 | 8/2004 |
| JP | 2005-195819 | 7/2005 |
| JP | 2006-106224 | 4/2006 |

(Continued)

*Primary Examiner* — Arnel C Lavarias  
(74) *Attorney, Agent, or Firm* — K&L Gates LLP

(57) ABSTRACT

An anti-glare film has a plurality of diffuser elements, and has specified optical properties. The ratio of I(α+1)/I(α) is more than 0.1 to 0.6, where I(α) is an intensity of a light reflected toward an arbitrary angle α of 10° or less from a specular reflection direction of an incident light upon the surface at an angle of 5° to 30° from the surface normal, and I(α+1) is an intensity of a reflected light deviated from the arbitrary angle α by 1° in a wide-angle direction. The gain of a light reflected in the direction at 20° or more from the specular reflection direction of the incident light is 0.02 or less, in which the gain is obtained by normalizing a reflected light intensity using a specular reflection intensity of a standard diffuse plate as 1. The diffuser elements have an average space therebetween of 50 to 300 micrometers.

3 Claims, 7 Drawing Sheets

FOREIGN PATENT DOCUMENTS

| | | |
|---|---|---|
| JP | 2006-116805 | 5/2006 |
| JP | 2007-156132 | 6/2007 |
| JP | 2007-163971 | 6/2007 |
| JP | 07-290652 | 11/2007 |
| JP | 2007-293303 | 11/2007 |
| JP | 2006-053371 | 2/2010 |
| WO | 2004/042471 | 5/2004 |
| WO | 2006/106757 | 10/2006 |

* cited by examiner

1

ANTI-GLARE FILM, METHOD FOR MANUFACTURING THE SAME, AND DISPLAY DEVICE USING THE SAME

CROSS-REFERENCE TO RELATED APPLICATIONS

The present application is a divisional of U.S. patent application Ser. No. 12/485,663 filed on Jun. 16, 2009 which is a divisional of U.S. patent application Ser. No. 12/030,730 filed on Feb. 13, 2008 and issued on Jul. 28, 2009 as U.S. Pat. No. 7,567,383 which claims priority to Japanese Patent Application No. 2007-033855 filed in the Japanese Patent Office on Feb. 14, 2007 and Japanese Patent Application No. 2007-341220 filed in the Japanese Patent Office on Dec. 28, 2007, the entire contents of which are incorporated herein by reference.

BACKGROUND

The present application relates to an anti-glare film, a method for manufacturing the same, and a display device using the same. Specifically, the present application relates to an anti-glare film used for the surface of a display device, such as a liquid crystal display, a plasma display, an electroluminescence display, or a cathode ray tube (CRT) display, a method for manufacturing the same, and a display device using the same.

In display devices, such as a liquid crystal display, a plasma display, and a CRT display, when ambient light from fluorescent lighting or the like is reflected in the surface of a display device, the visibility becomes markedly poor. Therefore, there has been employed a method in which an optical multilayer film or a low refractive-index film is formed on the surface of a display device to reduce the reflectance of the surface or a method in which an anti-glare film having a finely uneven surface is formed on the surface of a display device to cause diffuse reflection of ambient light so that the reflected images are blurred.

However, the use of an optical multilayer film increases the production cost, and does not achieve satisfactory anti-glare properties. When the increase of the production cost is suppressed by using a low refractive-index film, the resultant surface has a relatively high reflectance, and hence a problem of annoying reflection in the surface arises. On the other hand, in the method in which a mixture of silica filler, organic filler or the like is incorporated to form a surface having fine irregularities and a reflection in the surface of a display is blurred utilizing diffuse reflection, anti-glare properties can be obtained; however, the appearance of white muddiness is strong, and especially when ambient light is strong, the contrast is reduced, so that the visibility becomes poor.

In recent years, a surface treatment which suppresses the appearance of white muddiness and increases the contrast while suppressing appearance of white muddiness is desired, and some methods for the treatment have been developed. For example, in the Japanese Unexamined Patent Application Publication No. 2002-365410 (hereinafter referred to as "Patent Document 1"), a method for obtaining an anti-glare film unlikely to be whitish while preventing reflection in the surface is disclosed wherein, the ratio of an intensity of a reflected light deviated at 20° with respect to the specular reflection direction to a specular reflection intensity of an incident light upon the direction at −10° with respect the normal to the surface of the anti-glare film is 0.2 or less and the half band width of a peak of the reflected light intensity is 7° or more.

In the Japanese Unexamined Patent Application Publication No. 2004-61853 (hereinafter referred to as "Patent Document 2") discloses an anti-glare film in which the specular reflectance of the incident light collimated at an angle of 5° with the normal to the surface of the anti-glare film is substantially equal to the reflectance toward the specular reflection direction of the incident light at an angle deviated by 0.2° from the specular reflection. In addition, the Patent Document 2 also discloses a method for obtaining an anti-glare film having a value of $1/1,000$ or less in which the value is obtained by normalizing the reflected light intensity toward the normal direction with respect to the incident light upon the anti-glare film at 20° or more using a standard diffuser plate in the same measurement (hereinafter, the reflected light intensity normalized using an intensity of the reflected light from a standard diffuser plate is referred to as "gain").

The Japanese Unexamined Patent Application Publications No. 2006-53371 and No. 2004-240411 (hereinafter referred to as "Patent Document 3" and "Patent Document 4", respectively) have descriptions of a method for obtaining an anti-glare film in which, the regular reflectance is 1% or less with respect to the incident light upon the anti-glare film at an angle of incidence of 5° to 30°, and the ratio of the reflectance toward 30° or more with respect to the specular reflection direction to the specular reflectance is 0.001 or less.

However, there is a trade-off between anti-glare properties and suppression of the appearance of white muddiness, and it is difficult to design an anti-glare film having both the properties, and the solution has been not good enough. For example, it has been found that a known anti-glare film having surface irregularities formed using silica filler satisfies the diffuse reflection characteristics specified in the patent document 1 and the anti-glare film exhibits a strong appearance of white muddiness although the intensity ratio is 0.1 or less, and the anti-glare film can achieve anti-glare properties while the half band width is 7° or less.

The diffuse reflection characteristics described in the patent document 2, in which the specular reflectance is substantially equal to the reflectance toward the specular direction of the incident light deviated from an angle by 0.2° to the specular reflection, are satisfied by a film having a surface state close to the mirror reflection, and therefore it is difficult to obtain anti-glare properties merely by the technique described in the Patent Document 2. On the other hand, from the studies made by the present inventors, it has been found that, even when the gain to the normal direction is about $1/100$, the appearance of white muddiness of the film can be satisfactorily lowered although it is difficult to actually prepare an anti-glare film having characteristics such that the gain to the normal direction is $1/1,000$ or less.

Regarding the diffuse reflection characteristics specified in the Patent Documents 3 and 4, it has been found that there are cases where an anti-glare film achieves a regular reflectance of 1% or less even though the anti-glare film has a relatively even surface and a large reflection. In addition, it has been found that an anti-glare film subjected to a low-reflection treatment, for example, a low refractive index layer formed on the surface, satisfies such diffuse reflection characteristics, but the anti-glare properties are not good enough.

Further, as described above, an anti-glare film having fine irregularities in the surface provides anti-glare properties, but it has a problem in that the film has a rough surface appearance on visual perception. When an anti-glare film having a large rough surface appearance is used in a display device, the viewability of an image becomes lowered.

SUMMARY

Accordingly, it is desirable to provide an anti-glare film which is advantageous not only in that it has suppresses the appearance of white muddiness while achieving anti-glare properties, but also in that it has reduced rough surface appearance, a method for manufacturing the same, and a display device using the same.

In accordance with a first embodiment, there is provided an anti-glare film having a plurality of diffuser elements formed on a surface of the anti-glare film, and wherein the anti-glare film has the following optical properties of: (1) an $I(\alpha+1)/I(\alpha)$ ratio of more than 0.1 to 0.6, wherein $I(\alpha)$ is an intensity of a reflected light reflected toward an arbitrary angle $\alpha$ of 10° or less from a specular reflection direction of an incident light upon the surface having the plurality of diffuser elements thereon at an angle of 5° to 30° from the normal direction of the surface, and $I(\alpha+1)$ is an intensity of a reflected light deviated from the arbitrary angle $\alpha$ by 1° in a wide-angle direction (arbitrary angle $\alpha$ plus 1°, and (2) a gain of 0.02 or less of a light reflected in the direction at 20° or more from the specular reflection direction of the incident light, wherein the gain is obtained by normalizing a reflected light intensity using a specular reflection intensity of a standard diffuse plate as 1. The diffuser elements have an average space therebetween of 50 to 300 μm.

In accordance with a second embodiment, there is provided an anti-glare film having a plurality of diffuser elements on the surface thereof, wherein the anti-glare film has the following optical properties of: (1) a full width of angle of 6.0° to 28.0° at the $\frac{1}{100}$ reflected light intensity to a peak of a reflected light intensity, with respect to an incident light upon the surface having the plurality of diffuser elements thereon at an angle of 5° to 30° from the normal direction of the surface; and (2) a gain of 0.02 or less of light reflected in the direction at 20° or more from a specular reflection direction of the incident light, wherein the gain is obtained by normalizing a reflected light intensity using a specular reflection intensity of a standard diffuse plate as 1. The diffuser elements have an average space therebetween of 50 to 300 μm.

In accordance with a third embodiment, there is provided an anti-glare film having a plurality of diffuser elements on the surface thereof, and wherein the anti-glare film has the following optical properties of: (1) a full width of angle of 10.0° to 45.0° at the $\frac{1}{1,000}$ reflected light intensity to a peak of a reflected light intensity, with respect to an incident light upon the surface having the plurality of diffuser elements thereon at an angle of 5° to 30° from the normal direction of the surface, and (2) a gain of 0.02 or less of a light reflected in the direction at 20° or more from a specular reflection direction of the incident light, wherein the gain is obtained by normalizing a reflected light intensity using a specular reflection intensity of a standard diffuse plate as 1. The diffuser elements have an average space therebetween of 50 to 300 μm.

In accordance with a fourth embodiment, there is provided a method for manufacturing an anti-glare includes the step of forming fine irregularities in a surface of the anti-glare film by shape transfer method, sandblasting method, laser beam machining method, wet etching method, or Benard Cells forming method, to thereby form a plurality of diffuser elements on the surface. The anti-glare film has the following optical properties of: (1) an $I(\alpha+1)/I(\alpha)$ ratio of more than 0.1 to 0.6, wherein $I(\alpha)$ is an intensity of a reflected light reflected toward an arbitrary angle $\alpha$ of 10° or less from a specular reflection direction of an incident light upon the surface having the plurality of diffuser elements thereon at an angle of 5° to 30° from the normal direction of the surface, and $I(\alpha+1)$ is an intensity of a reflected light deviated from the arbitrary angle $\alpha$ by 1° in a wide-angle direction (arbitrary angle $\alpha$ plus 1°), and (2) a gain of 0.02 or less of a light reflected in the direction at 20° or more from the specular reflection direction of the incident light, wherein the gain being obtained by normalizing a reflected light intensity using a specular reflection intensity of a standard diffuse plate as 1, and wherein the diffuser elements have an average space therebetween of 50 to 300 μm.

In accordance with a fifth embodiment, there is provided a method for manufacturing an anti-glare film includes the step of forming fine irregularities in a surface of the anti-glare film by shape transfer method, sandblasting method, laser beam machining method, wet etching method, or Benard Cells forming method, to thereby form a plurality of diffuser elements on the surface. The anti-glare film has the following optical properties of: (1) a full width of angle of 6.0° to 28.0° at the $\frac{1}{100}$ reflected light intensity to a peak of a reflected light intensity, with respect to an incident light upon the surface having the plurality of diffuser elements thereon at an angle of 5° to 30° from the normal direction of the surface; and (2) a gain of 0.02 or less of a light reflected in the direction at 20° or more from a specular reflection direction of the incident light, wherein the gain is obtained by normalizing a reflected light intensity using a specular reflection intensity of a standard diffuse plate as 1, and wherein the diffuser elements have an average space therebetween of 50 to 300 μm.

In accordance with a sixth embodiment, there is provided a method for manufacturing an anti-glare film includes the step of forming fine irregularities in a surface of the anti-glare film by shape transfer method, sandblasting method, laser beam machining method, wet etching method, or Benard Cells forming method, to thereby form a plurality of diffuser elements on the surface. The anti-glare film has the following optical properties of: (1) a full width of angle of 10.0° to 45.0° at the $\frac{1}{1,000}$ reflected light intensity to a peak of a reflected light intensity, with respect to an incident light upon the surface having the plurality of diffuser elements thereon at an angle of 5° to 30° from the normal direction of the surface, and (2) a gain of 0.02 or less of a light reflected in the direction at 20° or more from a specular reflection direction of the incident light, wherein the gain is obtained by normalizing a reflected light intensity using a specular reflection intensity of a standard diffuse plate as 1, and wherein the diffuser elements have an average space therebetween of 50 to 300 μm.

In accordance with a seventh embodiment, there is provided a display device which includes: a display portion for displaying an image; and an anti-glare film formed on a display side of the display portion. The anti-glare film has a plurality of diffuser elements on a surface of the anti-glare film, and having the following optical properties of: (1) an $I(\alpha+1)/I(\alpha)$ ratio of more than 0.1 to 0.6, wherein $I(\alpha)$ is an intensity of a reflected light reflected toward an arbitrary angle $\alpha$ of 10° or less from a specular reflection direction of an incident light upon the surface having the plurality of diffuser elements thereon at an angle of 5° to 30° from the normal direction of the surface, and $I(\alpha+1)$ is an intensity of a reflected light deviated from the arbitrary angle $\alpha$ by 1° in a wide-angle-direction (arbitrary angle $\alpha$ plus 1°), and (2) a gain of 0.02 or less of a light reflected in the direction at 20° or more from the specular reflection direction of the incident light, wherein the gain is obtained by normalizing a reflected light intensity using a specular reflection intensity of a standard diffuse plate as 1. The diffuser elements have an average space therebetween of 50 to 300 μm.

In accordance with an eighth embodiment, there is provided a display device which includes a display portion for displaying an image and an anti-glare film formed on a display side of the display portion. The anti-glare film has a plurality of diffuser elements on a surface of the anti-glare film, and having the following optical properties of: (1) a full width of angle of 6.0° to 28.0° at the $1/100$ reflected light intensity to a peak of a reflected light intensity, with respect to an incident light upon the surface having the plurality of diffuser elements thereon at an angle of 5° to 30° from the normal direction of the surface; and (2) a gain of 0.02 or less of a light reflected in the direction at 20° or more from a specular reflection direction of the incident light, wherein the gain is obtained by normalizing a reflected light intensity using a specular reflection intensity of a standard diffuse plate as 1, and wherein the diffuser elements have an average space therebetween of 50 to 300 µm.

In accordance with a ninth embodiment, there is provided a display device which includes a display portion for displaying an image; and an anti-glare film formed on a display side of the display portion, wherein the anti-glare film having a plurality of diffuser elements on a surface of the anti-glare film, and having the following optical properties of: (1) a full width of angle of 10.0° to 45.0° at the $1/1,000$ reflected light intensity to a peak of a reflected light intensity, with respect to an incident light upon the surface having the plurality of diffuser elements thereon at an angle of 5° to 30° from the normal direction of the surface, and (2) a gain of 0.02 or less of a light reflected in the direction at 20° or more from a specular reflection direction of the incident light, wherein the gain is obtained by normalizing a reflected light intensity using a specular reflection intensity of a standard diffuse plate as 1, and wherein the diffuser elements have an average space therebetween of 50 to 300 µm.

In each of the first, fourth, and seventh embodiment, an anti-glare film having a specific ratio of the intensity of the reflected light toward an arbitrary angle of 10° or less to the intensity of the reflected light deviated from the arbitrary angle by 1° in a wide-angle direction (arbitrary angle α plus 1°) can achieve anti-glare properties. Specifically, with respect to a specular reflection direction of an incident light upon the surface having the plurality of diffuser elements thereon at an angle of 5° to 30° relative to the normal to the surface, an $I(\alpha+1)/I(\alpha)$ ratio is more than 0.1 to 0.6, wherein $I(\alpha)$ is an intensity of the reflected light reflected toward an arbitrary angle α of 10° or less from the specular reflection direction, and $I(\alpha+1)$ is an intensity of a reflected light deviated from the arbitrary angle α by 1° in a wide-angle direction (arbitrary angle α plus 1°). When the $I(\alpha+1)/I(\alpha)$ ratio for the reflected light intensity is more than 0.1, anti-glare properties can be obtained, and when the $I(\alpha+1)/I(\alpha)$ ratio is 0.6 or less, the appearance of white muddiness can be suppressed.

In each of the second, fifth, and eighth embodiments, an anti-glare film having a specific full width of angle at the $1/100$ reflected light intensity to a peak of a reflected light intensity can achieve anti-glare properties. Specifically, with respect to an incident light upon the surface having the plurality of diffuser elements thereon at an angle of 5° to 30° relative to the normal direction of the surface, the full width of angle at the $1/100$ reflected light intensity with respect to the peak of the reflected light intensity is 6.0° to 28.0°. When the full width of angle at the $1/100$ reflected light intensity with respect to the peak of reflected light intensity is 6.0° or more, anti-glare properties can be obtained, and when the full width of angle is 28.0° or less, the appearance of white muddiness can be suppressed.

In each of the third, sixth, and ninth embodiments, an anti-glare film having a specific full width of angle at the $1/1,000$ reflected light intensity to a peak of a reflected light intensity can achieve anti-glare properties. Specifically, with respect to an incident light upon the surface having the plurality of diffuser elements thereon at an angle of 5° to 30° relative to the normal direction of the surface, the full width of angle at the $1/1,000$ reflected light intensity to the peak of the reflected light intensity is 10.0° to 45.0°. When the full width of angle at the $1/1,000$ reflected light intensity to the peak of reflected light intensity is 10.0° or more, anti-glare properties can be obtained, and when the full width of angle is 45.0° or less, the appearance of white muddiness can be suppressed.

In an embodiment, when the anti-glare film has a specific gain of the light reflected in the direction at 20° or more from the specular reflection direction, the appearance of white muddiness can be suppressed. Specifically, the gain of the light reflected in the direction at 20° or more from the specular reflection direction is 0.02 or less.

When the anti-glare film has a specific average space between the diffuser elements, the rough surface appearance can be reduced according to an embodiment. Specifically, the average space between the diffuser elements is 50 to 300 µm.

Additional features and advantages are described herein, and will be apparent from the following Detailed Description and the figures.

DETAILED DESCRIPTION

The present application will be described below in greater detail with reference to the figures according to an embodiment.

(1) First Embodiment (1-1) Configuration of Anti-Glare Film

Figure 1:
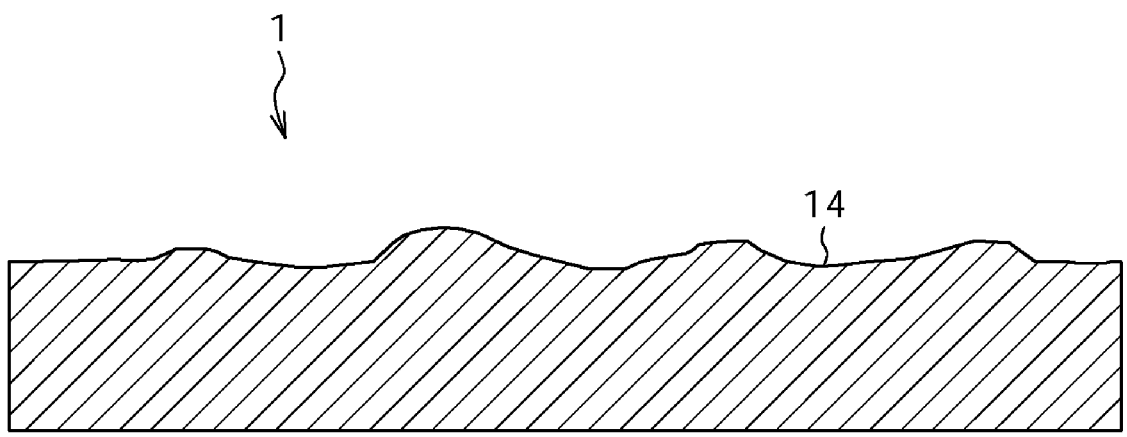
FIG. 1 is an enlarged cross-sectional view showing an example of the configuration of an anti-glare film according to a first embodiment.

FIG. 1 is an enlarged cross-sectional view showing an example of the configuration of an anti-glare film according to a first embodiment. A plurality of protuberances are formed on a surface 14 of an anti-glare film 1 as diffuser elements, so that the surface collectively has fine irregularities. The present inventors have made extensive and intensive studies on the diffuse reflection characteristics of the anti-glare film 1. As a result, it is found that the anti-glare film 1 having specific diffuse reflection characteristics described below can achieve both excellent anti-glare properties and suppression of the appearance of white muddiness, and have succeeded in obtaining such an anti-glare film.

For achieving the anti-glare properties, an absolute value of specular reflection intensity is required to be reduced, but it is more desirable that the diffuse reflection characteristics do not sharply change. There is a correlation between the visual sensitivity of a human and a logarithm of the intensity of light, and therefore, when a logarithm of the intensity for the diffuse reflection characteristics sharply changes, the reflection edge of a light source is visually perceived, so that the surface exhibits no anti-glare properties. Thus, the anti-glare film 1 according to a first embodiment satisfies an $I(\alpha+1)/I(\alpha)$ ratio of more than 0.1 to 0.6, wherein $I(\alpha)$ is an intensity of a reflected light toward an arbitrary angle $\alpha$ of 10° or less from a specular reflection direction of an incident light upon a surface 14 at an angle of 5° to 30° from the normal line of the surface 14, and $I(\alpha+1)$ is an intensity of a reflected light deviated from the angle $\alpha$ by 1° in a wide-angle direction. If the $I(\alpha+1)/I(\alpha)$ ratio is not less than 0.1, the intensity changes abruptly and the edge tends to become observed, whereby no anti-glare properties are perceived. If the $I(\alpha+1)/I(\alpha)$ ratio is more than 0.6, the appearance of white muddiness becomes larger although the anti-glare properties are obtained.

A full width of angle that becomes the 1/100 reflected light intensity to a peak of a reflected light intensity, with respect to an light incident from an direction of angle 5° to 30° from the normal direction of the surface 14, is 6.0° to 28.0°, so that the anti-glare properties similar to the diffuse reflection characteristics specified by described above are achieved. If the full width of angle is not more than 6.0°, the intensity changes abruptly and the edges tends to be observed. If the full width of angle is over 28.0°, the appearance of white muddiness is exhibited although the anti-glare properties are obtained.

Similarly, a full width of angle that becomes the 1/1,000 reflected light intensity to a peak of a reflected light intensity, with respect to an light incident from an direction of angle 5° to 30° with respect to the normal direction of the surface 14, is 10.0° to 45.0°, so that the anti-glare properties similar to the diffuse reflection characteristics specified by described above are achieved. If the full width of angle is not more than 10.0°, the intensity changes abruptly and the edges tends to be observed. If the full width of angle is over 45.0°, the appearance of white muddiness is exhibited although the anti-glare properties are achieved.

The diffuse reflection characteristics of the anti-glare film 1 are determined by measuring a reflected light intensity using, e.g., a goniophotometer GP-1-3D, manufactured and sold by OPTEC Co., Ltd. In the measurement, for removing the effect of reflection off the back surface to determine the diffuse reflection characteristics of the anti-glare film 1 per se, a black glass or black acrylic sheet is bonded through an adhesive to an opposite to the surface 14 of the anti-glare film 1.

On the other hand, regarding the appearance of white muddiness, the reflectance at an angle of 10° or more from the specular direction is of consequence. The reason for this is that the degree of white muddiness is lowered by reducing the light components diffusing in a wide-angle direction from the specular reflection direction. Accordingly, the anti-glare film 1 according to a first embodiment satisfies diffuse reflection characteristics such that a gain of the light reflected in the direction at 20° or more from the specular reflection direction from the specular reflection direction of the incident light, in which the gain is obtained by normalizing a reflected light intensity using a specular reflection intensity of a standard diffuse plate as 1, is 0.02 or less, with respect to the incident light upon the surface in the direction at an angle of 5° to 30° from the normal to the surface 14. Preferably, the gain of light reflected toward the direction at 20° or from the specular reflection direction is 0.01 or less. The gain of light reflected toward the direction at 10° or more may be 0.25 or less, more preferably 0.08 or less. Thus, the appearance of white muddiness in the anti-glare film can be suppressed. A gain means a reflected light intensity normalized using a standard diffuser plate, and a gain is a value of reflected light intensity standardized using as 1 an intensity of the regular reflected light measured using a barium sulfate standard diffuser plate in the same measurement.

The anti-glare film 1 preferably has a surface haze of 5.0% or less, more preferably 3.0% or less. If the surface haze is 5.0% or less, the anti-glare film is reduced in the appearance of white muddiness, and, if the surface haze is 3.0% or less, the anti-glare film is further reduced in the appearance of white muddiness. The surface haze is a value obtained by detecting the surface scattering, and, the higher the surface haze, the higher the appearance of white muddiness. On the other hand, regarding the internal haze, there is no particular limitation.

An internal haze, when used herein, is determined by, for example, making a measurement with respect to the anti-glare film 1 having an adhesive having a haze of 1.0% or less attached onto the surface of the anti-glare layer 14 under the conditions for measurement described in JIS K7136 using a haze meter HM-150 (manufactured and sold by MURAKAMI COLOR RESEARCH LABORATORY). A surface haze is determined by making a measurement with respect to the anti-glare film 1 in the same manner as in the determination of an internal haze, thereby obtaining a difference between the resultant value and the internal haze.

The optical properties of the anti-glare film 1 is obtained by the diffuser elements formed on the surface 14 such that the surface 14 has fine irregularities. By reducing the size of the diffuser elements, scintillation caused due to the rough surface appearance on visual perception or glare of the screen (hereinafter, the glare of the screen is frequently referred to as "surface glare") can be suppressed.

The rough surface appearance on visual perception means that the perceived granularity having uneven luminance is observed by reflections off one diffuser element in different directions when reflecting a light source having a uniform light intensity off the anti-glare film 1. Accordingly, it is advantageous that the space between the diffuser elements is reduced so that the individual diffuser elements can be separated from one another when observed at the optimum viewing distance of an image display device using the anti-glare film 1. Specifically, the rough surface appearance can be suppressed by reducing the average space between the diffuser elements when the diffuser elements are specified by volume diffusion, or reducing the average peak-valley space Sm when the diffuser elements are specified by surface diffusion.

Accordingly, the anti-glare film 1 according to a first embodiment satisfies characteristic such that the average space between the diffuser elements, namely, the average peak-valley space Sm of the surface 14 is 300 μm or less, more preferably 220 μm or less. The average space between the diffuser elements, namely, the average peak-valley space Sm of the surface 14 of the anti-glare film 1 is preferably 2 μm or more from the viewpoint of appropriately controlling the diffuse reflection characteristics and preventing coloration, and is preferably 50 μm or more from the viewpoint of practical controlling properties.

A resolution d (dpi) of a person having a visual acuity V such that the person can distinguish white from black in respect of a subject placed at a distance D (cm) from the person is determined by the following formula:

$$d=2.54\times3,438\times V/D$$

From the calculation, it is found that the resolution of a person having a visual acuity of 1.0 at a viewing distance of 100 centimeters (cm) is about 290 micrometers (μm). Therefore, it is considered that, when the average peak-valley space Sm falls within the above range, the rough surface appearance can be suppressed.

The average peak-valley space Sm of the anti-glare film 1 is determined as a roughness parameter from a roughness curve obtained by measuring surface roughness in accordance with the method described in JIS B0601-1994 using, e.g., SURFCORDER ET4000A, manufactured and sold by Kosaka Laboratory Ltd., as an Automatic Microfigure Measuring Instrument.

On the other hand, the surface glare is affected by the relationship between the space between the diffuser elements of the anti-glare film 1 and the pixel pitch, and therefore it is preferred to control the space according to the pixel pitch of the image display device used. When the space between the diffuser elements is not smaller than the pixel pitch, the relative positional relationship is not uniform between the individual diffuser elements, so that it is recognized as surface glare. Therefore, when the space between the diffuser elements is ⅓ or less, more preferably ¼ or less of the pixel size of the image display device, surface glare can be prevented.

The anti-glare film 1 having fine irregularities in the surface thereof in a first embodiment is composed of, for example, a resin. The resin used for the anti-glare film 1 includes at least one of an ionizing radiation-curable resin which is cured by, for example, ultraviolet radiation or electron radiation, a thermosetting resin which is cured by heating, or a thermoplastic resin, from the viewpoint of facilitating the production. As the ionizing radiation-curable resin, an acrylate resin, such as urethane acrylate, epoxy acrylate, polyester acrylate, polyol acrylate, polyether acrylate, or melamine acrylate, may be used. With respect to the properties of the cured resin, especially preferred is a resin which produces a cured resin having excellent permeability to light from the viewpoint of achieving image permeability or a resin which produces a cured resin having high hardness from the viewpoint of obtaining a flaw resistance, and a resin can be appropriately selected. The ionizing radiation-curable resin is not limited to an ultraviolet curing resin, and any ionizing radiation-curable resin may be used as long as it has permeability to light, but preferred is an ionizing radiation-curable resin which does not markedly change in hue of the transmitted light or transmitted light amount due to coloration or haze.

The photosensitive resin is obtained by incorporating a photopolymerization initiator into an organic material which is capable of forming a resin, such as monomers, oligomers, or a polymer. For example, an urethane acrylate resin is obtained by reacting isocyanate monomers or a prepolymer with polyester polyol and reacting acrylate or methacrylate monomers having a hydroxyl group with the resultant product.

As the photopolymerization initiator, for example, a benzophenone derivative, an acetophenone derivative, an anthraquinone derivative, and the like can be used individually or in combination. In the photosensitive resin, a component for facilitating the film formation, such as an acrylic resin, may be appropriately selected and incorporated.

In the photosensitive resin, a light stabilizer, an ultraviolet light absorber, an antistatic agent, a flame retardant, an antioxidant, or the like may be added in an appropriate amount if desired. Silica fine particles or the like may be added as a viscosity modifier.

(1-2) Method for Manufacturing an Anti-Glare Film

A method for manufacturing the anti-glare film 1 according to a first embodiment is described with reference to FIGS. 2A to 2E.

(Process for Preparing a Mother Die)

Figure 2A:
FIGS. 2A to 2E are cross-sectional views showing an example of processes for manufacturing an anti-glare film according to a first embodiment.

A base material to be processed is first prepared. Examples of forms of the base material include a substrate form, a sheet form, a film form, and a block form. Examples of materials for the base material include plastics, metals, and glass. Then, the base material is processed using a mask imaging method using, e.g., a KrF excimer laser, a pressing method, a method using a stamper for molding, a cutting method, a sandblasting method, a wet etching method, or the like to pattern in the surface of the base material fine irregularities corresponding to the surface 14 of the anti-glare film 1, thereby obtaining a mother die 21 having an inverse fine irregularities of the shape in the surface 14 as shown in FIG. 2A. The surface of the mother die 21 has fine irregularities such that the anti-glare film 1 can achieve diffuse reflection characteristics as described above, and has an average peak-valley space Sm of 300 μm or less, preferably 220 μm or less.

(Process for Preparing a Duplicate Master)

Figure 2B:

Next, a conducting film is formed on the fine irregularities of the above-obtained mother die 21 by, for example, an electroless plating method. The conducting film is a metal film composed of a metal, such as nickel. Then, the mother die 21 having a conducting film formed thereon is set in an electroforming apparatus, and a metal plating layer, such as a nickel plating layer, is formed on the conducting film by, for example, an electroplating method. The metal plating layer is then released from the mother die 21, obtaining a duplicate master 22 having an inverse fine irregularities of the shape in the mother die 21 as shown in FIG. 2B.

Figure 2C:
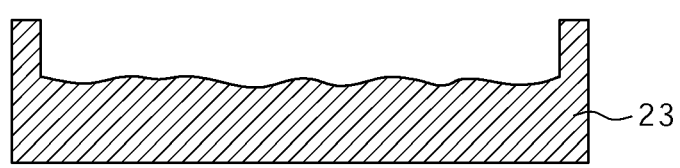

Then, the above-obtained duplicate master 22 is subjected to surface treatment, and then a metal plating layer, such as a nickel plating layer, is formed on the fine irregularities of the resultant duplicate master by, for example, an electroplating method. The metal plating layer is then released from the duplicate master 22, thereby obtaining a duplicate master 23 having the same fine irregularities as that of the mother die 21 as shown in FIG. 2C.

When the mother die is composed of an organic substance or the like, which is likely to be damaged, a child mold and a grandchild mold are prepared from the mother die as described above, and a grandchild mold is prepared in a great amount using the child mold even when the mother die is damaged upon releasing the mother die. On the other hand, when the mother die is unlikely to be damaged and a child mold may be repeatedly prepared from the mother die, the mother die is processed so that it has the same shape as that of the anti-glare layer and the resultant reverse child mold may be used as a transfer mold.

(Process for Preparing an Anti-Glare Film)

Figure 2D:
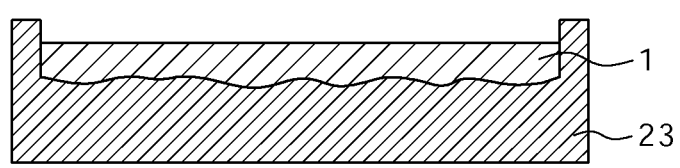

Next, a photosensitive resin such as an ultraviolet curing resin is poured into the fine irregularities of the above-obtained duplicate master 23, as shown in FIG. 2D, to render the thickness of the photosensitive resin uniform. The fine irregularities of the surface 14 is obtained by shape transfer, and hence it is not necessary to add fine particles to the photosensitive resin, but fine particles may be added to the photosensitive resin for finely controlling the haze or surface shape.

Figure 2E:
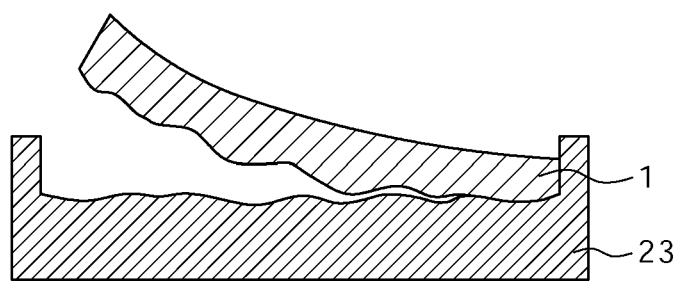

And then, by photo-irradiation such as ultraviolet irradiation from the side of the poured photosensitive resin, the resin is cured. Then, as shown in FIG. 2E, the cured photosensitive resin is released from the duplicate master 23. Thus, the anti-glare film having fine irregularities which is a moderate waviness in the surface 14 is obtained.

The anti-glare film 1 prepared by the above processes has specific diffuse reflection characteristics as described above, and hence suppresses the appearance of white muddiness while providing anti-glare properties. Further, the anti-glare film has a specific space between the diffuser elements formed in the surface 14, and hence reduces rough surface appearance. Accordingly, by using the anti-glare film 1 in a display device, such as a liquid crystal display, a plasma display, an electroluminescence display, or a CRT display, display achieving both excellent anti-glare properties and excellent contrast can be provided, thereby improving the visibility.

(2) Second Embodiment (2-1) Construction of Anti-Glare Film

Figure 3:
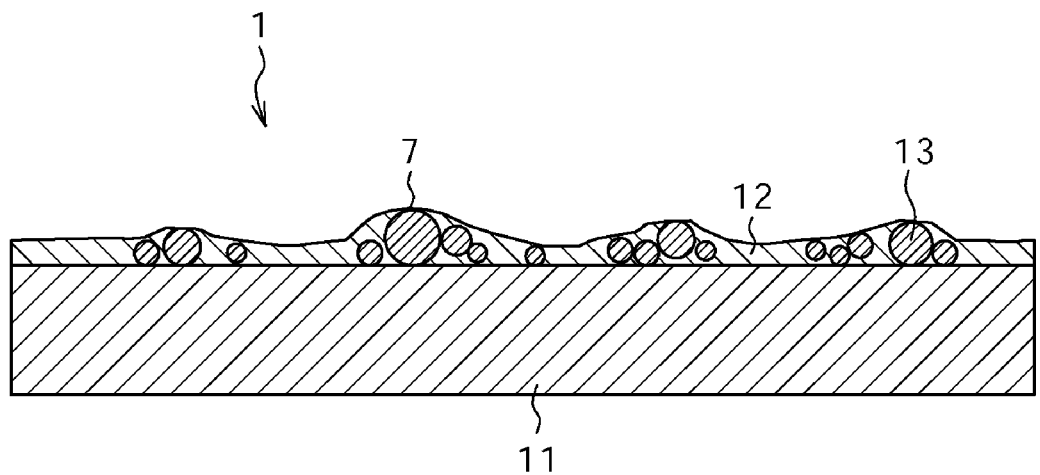
FIG. 3 is an enlarged cross-sectional view showing the configuration of an anti-glare film according to a second embodiment.

FIG. 3 is an enlarged cross-sectional view showing an example of the construction of an anti-glare film according to a second embodiment. An anti-glare film 1 includes a substrate 11, and an anti-glare layer 12 having fine particles 13 formed on the substrate 11. The fine particles 13 form a plurality of protuberances as diffuser elements in the surface of the anti-glare layer 12. Consequently, the surface of the anti-glare layer 12 collectively has fine irregularities. The present inventors have made extensive and intensive studies on the diffuse reflection characteristics of the anti-glare film 1. As a result, it is found that the anti-glare film 1 having specific diffuse reflection characteristics described below can achieve both excellent anti-glare properties and suppression of the appearance of white muddiness, and have succeeded in obtaining such an anti-glare film.

Figure 4:
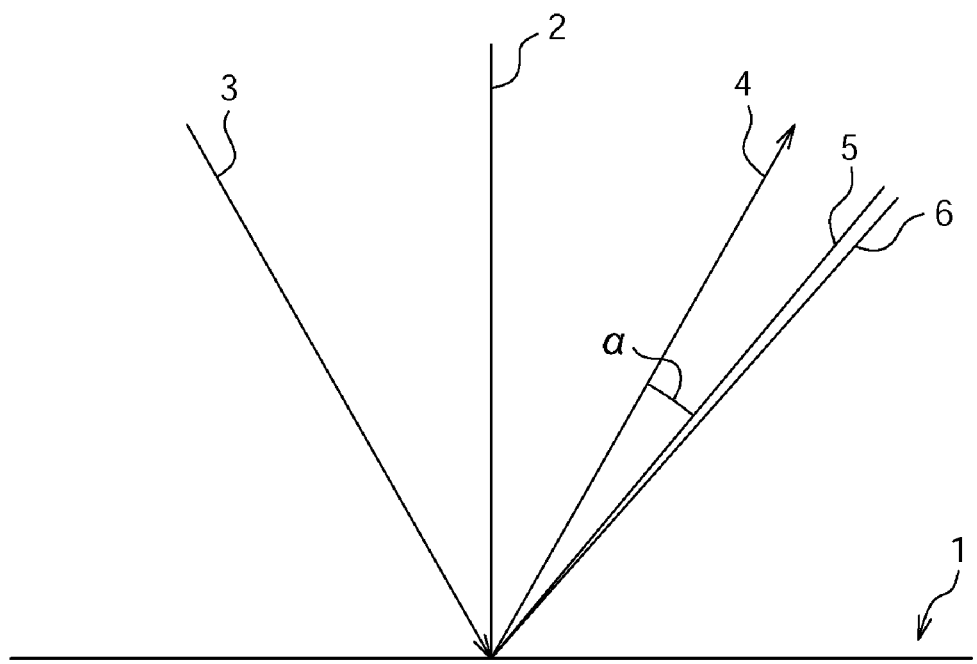
FIG. 4 is a view diagrammatically showing an example of conditions for measurement of diffuse reflection characteristics to an incident light upon a surface at an angle of 5° to 30° with respect to the normal direction of an anti-glare film according to a second embodiment.

For achieving the anti-glare properties, an absolute value of intensity of the regular reflected light is required to be reduced, but it is more desirable that the diffuse reflection characteristics do not sharply change. There is a correlation between the visibility of a human and a logarithm of the intensity of light, and therefore, when a logarithm of the intensity for the diffuse reflection characteristics sharply changes, the edge of a reflection of a light source in the surface is visually recognized, so that the surface exhibits no anti-glare properties. Therefore, the anti-glare film 1 according to a second embodiment of present invention satisfies diffuse reflection characteristics such that, with respect to the incident light upon the surface of the anti-glare layer 12 in the direction 3 at an angle of 5° to 30° from the normal 2 to the surface as shown in FIG. 4, an $I(\alpha+1)/I(\alpha)$ ratio is more than 0.1, wherein $I(\alpha)$ is an intensity of the reflected light in the direction 5 at an arbitrary angle $\alpha$ of 10° or less from the specular direction 4, and $I(\alpha+1)$ is an intensity of the reflected light in the direction 6 at the angle $\alpha$ by 1° in a wide-angle direction. In this case, a change of the logarithm of the intensity of the reflected light can be −1 or smaller, and hence the edge of a reflection is no longer distinct, thus obtaining anti-glare properties. On the other hand, when the $I(\alpha+1)/I(\alpha)$ ratio for the reflected light intensity is increased, the anti-glare properties can be obtained, but the appearance of white muddiness becomes stronger. Therefore, the $I(\alpha+1)/I(\alpha)$ ratio for the reflected light intensity is 0.6 or less.

Figure 5:
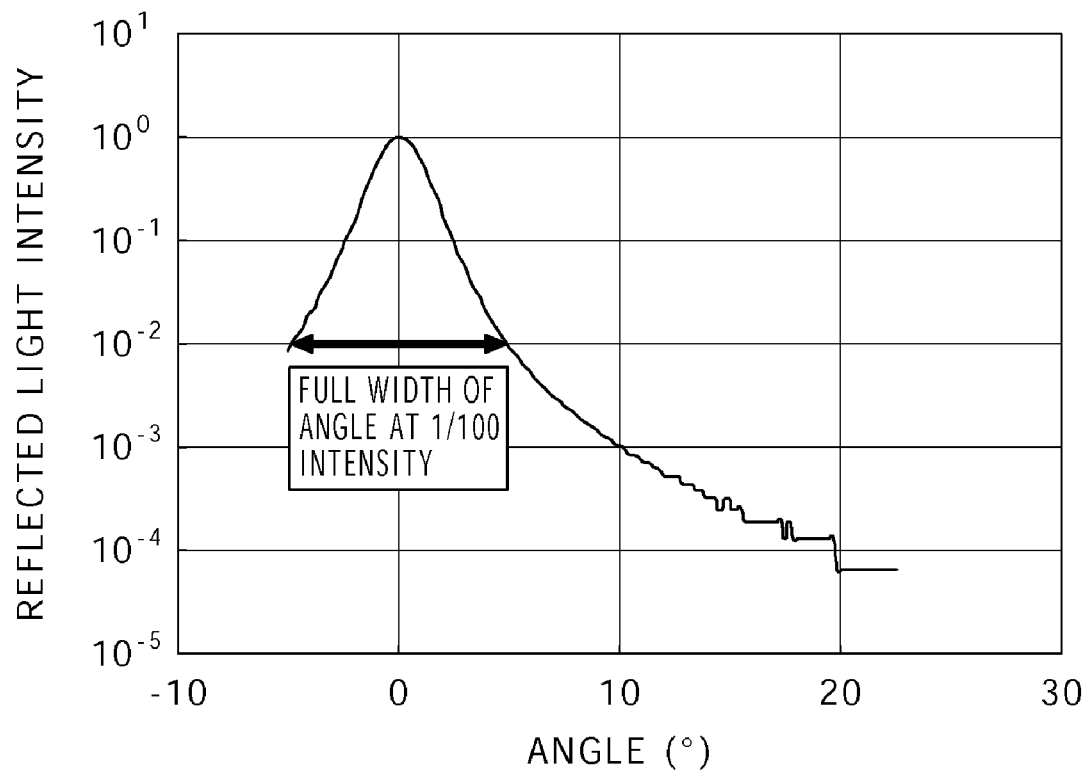
FIG. 5 is a graph showing an example of the diffuse reflection characteristics of an anti-glare film according to a second embodiment.

FIG. 5 is a graph showing an example of the relationship between an angle ($\alpha$) and a reflected light intensity $I(\alpha)$ when the specular direction is 0° with respect to the incident light upon the surface of the anti-glare layer 12. Arrows in the figure indicate the full width of angle at the $1/100$ reflected light intensity with respect to the peak of reflected light intensity. It has been found that, with respect to the incident light upon the surface of the anti-glare layer 12 in the direction 3 at an angle of 5 to 30° from the normal 2 of the surface, when the full width of angle at the $1/100$ reflected light intensity with respect to the peak of reflected light intensity is 6.0° to 28.0°, anti-glare properties similar to the above specific diffuse reflection characteristics can be achieved. When this full width of angle is less than 6.0°, a change of the intensity is such sharp that the edge of a reflection is likely to be observed. On the other hand, when the full width of angle is more than 28.0°, anti-glare properties are obtained, but the appearance of white muddiness is exhibited.

Similarly, it has been found that, regarding the incident light upon the surface of the anti-glare layer 12 in the direction 3 at an angle of 5° to 30° from the normal 2 of the surface, when the full width of angle at the $1/1,000$ reflected light intensity with respect to the peak of reflected light intensity is 10.0° to 45.0°, anti-glare properties similar to the above specific diffuse reflection characteristics can be obtained. The full width of angle at the $1/10$ reflected light intensity with respect to the peak can be similarly specified, but the diffuse reflection characteristics of a surface having gloss such that a reflection is seen and those of a surface having appropriate anti-glare properties are similar to each other at an angle at the about $1/10$ intensity, and it has been found that the anti-glare properties are not obtained merely by specifying the diffuse reflection characteristics.

The diffuse reflection characteristics of the anti-glare film 1 are determined by measuring a reflected light intensity using, e.g., a goniophotometer GP-1-3D, manufactured and sold by OPTEC Co., Ltd. In the measurement, for removing the effect of reflection off the back surface to determine the diffuse reflection characteristics of the anti-glare film 1 per se, a black glass or black acrylic sheet is bonded through an adhesive to the surface of the anti-glare film 1 on which the anti-glare layer 12 is not formed.

On the other hand, regarding the appearance of white muddiness, the reflectance at an angle of 10° or more from the specular reflection direction is of consequence. The reason for this is that the degree of white muddiness degree can be lowered by reducing the light components diffused at angles larger than the angle of the specular reflection direction from the normal of the surface. Accordingly, in the anti-glare film 1 according to an first embodiment, with respect to the incident light upon the surface of the anti-glare layer 12 in the direction 3 at an angle of 5° to 30° from the normal 2 of the surface, diffuse reflection characteristics such that a gain of the light reflected in the direction at 20° or more from the specular reflection direction is 0.02 or less, more preferably 0.01 or less, as normalized using an intensity of the specular reflected light from a standard diffuser plate as 1, are satisfied, and it is advantageous that a gain of the light reflected in the direction at 10° or more from the specular reflection direction is 0.25 or less, more preferably 0.08 or less. In this case, the appearance of white muddiness in the anti-glare film can be suppressed. A "gain" used herein means a reflected light intensity normalized using a standard diffuser plate, and, in an embodiment, a gain is a value of reflected light intensity normalized using as 1 an intensity of the regular reflected light measured using a barium sulfate standard diffuser plate in the same measurement.

The anti-glare film 1 preferably has a surface haze of 5.0% or less, more preferably 3.0% or less. When the surface haze is 5.0% or less, the anti-glare film is reduced in the appearance of white muddiness, and, when the surface haze is 3.0% or less, the anti-glare film is further reduced in the appearance of white muddiness. The surface haze is a value obtained by detecting the surface scattering, and, the higher the surface haze, the higher the appearance of white muddiness. On the other hand, with respect to the internal haze, there is no particular limitation, and it is determined depending on the fine particles 13 contained in the anti-glare layer 12 and the like.

In an embodiment, an internal haze is determined by, for example, making a measurement of the anti-glare film 1 having an adhesive having a haze of 1.0% or less bonded onto the surface of the anti-glare layer 12 under the conditions for measurement described in JIS K7136 using a haze meter HM-150 (manufactured and sold by MURAKAMI COLOR RESEARCH LABORATORY). A surface haze is determined by making a measurement with respect to the anti-glare film 1 in the same manner as in the determination of an internal haze, and obtaining a difference between the resultant value and the internal haze.

Such optical characteristics of the anti-glare film 1 are obtained by the diffuser elements formed on the surface of the anti-glare layer 12 such that the surface of the anti-glare layer 12 has fine irregularities. By reducing the size of the diffuser elements, scintillation caused due to rough surface appearance of the surface or glare of the screen (hereinafter, the glare of the screen is frequently referred to as "surface glare") can be suppressed.

The rough surface appearance of the surface means uneven luminance from the surface caused by reflections off one diffuser element in different directions when reflecting a light source having a uniform light intensity off the anti-glare film 1. Therefore, it is advantageous that the space between the diffuser elements is reduced so that the individual diffuser elements can be separated from one another when observed at the optimum viewing distance of an image display device using the anti-glare film 1. Specifically, the rough surface appearance can be suppressed by reducing the average space between the diffuser elements when the diffuser elements are specified by volume diffusion, or reducing the average peak-valley space Sm when the diffuser elements are specified by surface diffusion.

Accordingly, the anti-glare film 1 according to a second embodiment satisfies characteristic such that the average space between the diffuser elements, namely, the average peak-valley space Sm of the surface of the anti-glare layer 12 is 300 μm or less, more preferably 220 μm or less. The average space between the diffuser elements, namely, the average peak-valley space Sm of the surface of the anti-glare layer 12 is preferably 2 μm or more from the viewpoint of appropriately controlling the diffuse reflection characteristics and preventing coloration, and is preferably 50 μm or more from the viewpoint of practical controlling properties.

A resolution d (dpi) of a person having a visual acuity V such that the person can distinguish white from black in respect of a subject placed at a distance D (cm) from the person is determined by the following formula:

$$d = 2.54 \times 3{,}438 \times V/D$$

From the calculation, it is found that the resolution of a person having a visual acuity of 1.0 at a viewing distance of 100 centimeters (cm) is about 290 micrometers (μm). Therefore, it is considered that, when the average peak-valley space Sm falls within the above range, the rough surface appearance can be reduced.

The average peak-valley space Sm of the anti-glare film 1 is determined as a roughness parameter from a roughness curve obtained by measuring surface roughness in accordance with the method described in JIS B0601-1994 using, e.g., SURFCORDER ET4000A, manufactured and sold by Kosaka Laboratory Ltd., as an Automatic Microfigure Measuring Instrument.

On the other hand, the surface glare is affected by the relationship between the space between the diffuser elements of the anti-glare film 1 and the pixel pitch, and therefore it is preferred to control the space according to the pixel pitch of the image display device used. When the space between the diffuser elements is not smaller than the pixel pitch, the relative positional relationship is not uniform between the individual diffuser elements, so that it is recognized as surface glare. Therefore, when the space between the diffuser elements is ⅓ or less, more preferably ¼ or less of the pixel size of the image display device, surface glare can be prevented.

The anti-glare layer 12 according to a second embodiment, which has fine irregularities of the surface, includes, for example, a resin including fine particles 13. In the fine irregularities of the surface, it is preferable that the fine particles 13 are covered with a resin, such as an ionizing radiation-curable resin. The irregularities may be a moderately sloping irregularities, and, for example, it is preferred that a plurality of fine particles 13 are appropriately agglomerated in the in-plane direction to form one diffuser element. Either the whole surface of the agglomerated fine particles 13 may be covered with a resin, such as an ionizing radiation-curable resin or a thermosetting resin, or the surface of the fine particles 13 may be exposed as long as the above-mentioned diffuse reflection characteristics are satisfied. However, when the fine particles 13 protrude from the anti-glare layer 12 to form a steep slope portion, it is difficult to satisfy the above diffuse reflection characteristics, and further the surface is likely to have rough surface appearance. Therefore, when the surface of the fine particles 13 is exposed, it is preferred that only part of the surface of the fine particles 13 positioned at, for example, a tip portion 7 of protuberances as the diffuser elements is an exposed portion.

The term "a plurality of fine particles 13 are appropriately agglomerated in the in-plane direction" as used herein means: (1) that all the fine particles 13 are agglomerated only in the in-plane direction without being stacked on one another in the thicknesswise direction of the anti-glare layer 12; or (2) that almost all the fine particles 13 are agglomerated in the in-plane direction and the remaining fine particles 13 are stacked on one another in the thicknesswise direction so that the degree of white muddiness is not increased (to more than 2.0 as measured using a black glass sheet). All the fine particles 13 ideally form two-dimensional agglomerates, but part of the fine particles 13 may be separate from one another without forming aggregates so that the degree of white muddiness is not increased.

As a resin used in the anti-glare layer 12, from the viewpoint of facilitating the production, an ionizing radiation-curable resin which is curable by irradiation with, e.g., ultraviolet light or an electron beam, or a thermosetting resin which is curable by heat is preferred, and the most preferred is a photosensitive resin which is curable by irradiation with ultraviolet light. As the photosensitive resin, an acrylate resin, such as urethane acrylate, epoxy acrylate, polyester acrylate, polyol acrylate, polyether acrylate, or melamine acrylate, can be used. With respect to the properties of the cured resin, especially preferred is a resin which can produce a cured resin having excellent permeability to light from the viewpoint of achieving image permeability or a resin which can produce a cured resin having high hardness from the viewpoint of obtaining a flaw resistance, and a resin may be appropriately selected. The ionizing radiation-curable resin is not limited to an ultraviolet curing resin, and any ionizing radiation-curable resin may be used as long as it has permeability to light, but preferred is an ionizing radiation curing resin which does not markedly change in hue of the transmitted light or transmitted light amount due to coloration or haze.

The photosensitive resin is obtained by incorporating a photopolymerization initiator into an organic material which is capable of forming a resin, such as monomers, oligomers, or a polymer. For example, an urethane acrylate resin is obtained by reacting isocyanate monomers or a prepolymer with polyester polyol and reacting acrylate or methacrylate monomers having a hydroxyl group with the resultant product.

As the photopolymerization initiator, for example, a benzophenone derivative, an acetophenone derivative, an anthraquinone derivative, and the like may be used individually or in combination. In the photosensitive resin, a component for facilitating the film formation, such as an acrylic resin, may be appropriately selected and incorporated.

In the photosensitive resin, a light stabilizer, an ultraviolet light absorber, an antistatic agent, a flame retardant, an antioxidant, or the like may be added in an appropriate amount if desired. Silica fine particles or the like may be added as a viscosity modifier.

As the fine particles 13, for example, organic fine particles or inorganic fine particles are used. As organic fine particles, beads, such as acryl, styrene, acryl-styrene copolymer, melamine, or polycarbonate beads, can be used. They may be either cross-linked or uncross-linked, and any spherical or flattened fine particles comprised of a plastic can be used. As the fine particles 13, for example, those having an average particle diameter of 5 nanometers (nm) to 15 micrometers (μm) are used. When the average particle diameter of the fine particles is more than 15 μm, light reflected off the surface disadvantageously causes glare. On the other hand, when the average particle diameter is less than 5 nm, the particles dispersed upon preparing the coating composition are disadvantageously agglomerated again. The average particle diameter of the fine particles 13 can be measured by, for example, a laser diffraction method.

The anti-glare film 1 may have, although not shown, a layer containing filler or containing no filler formed on the anti-glare layer 12, i.e., an anti-glare layer composed of two layers.

As the substrate 11, for example, a plastic film having transparency is used. As such a film, a known polymer film may be used. Specifically, a polymer film may be appropriately selected from films comprised of known resins, such as triacetylcellulose, polyester, polyethylene terephthalate (PET), polyimide (PI), polyamide, aramid, polyethylene, polyacrylate, polyether sulfone, polysulfone, diacetylcellulose, polypropylene, polyvinyl chloride, an acrylic resin, polycarbonate, an epoxy resin, an urea resin, an urethane resin, and a melamine resin. The substrate is not limited to a film, and, for example, a sheet or plate comprised of a plastic having transparency can be used.

Regarding the thickness of the substrate 11, there is no particular limitation, and the thickness is appropriately selected. From the viewpoint of achieving excellent productivity, it is preferred that the thickness of the substrate is 38 to 100 μm, but the thickness is not limited to this range.

(2-2) Method for Manufacturing an Anti-Glare Film

Next, a method for manufacturing the anti-glare film 1 according to a second embodiment is described. A solvent is first mixed into, for example, the above-mentioned ionizing radiation-curable resin, fine particles 13, and optionally a light stabilizer, an ultraviolet light absorber, an antistatic agent, a flame retardant, an antioxidant, or the like to prepare a coating composition having the fine particles 13 dispersed therein. Regarding the solvent, there is no particular limitation, and an organic solvent, such as t-butanol, toluene, methyl ethyl ketone (MEK), or isopropyl alcohol (IPA), may be used.

Then, the coating composition prepared is applied substantially uniformly to the above-mentioned substrate 11. Regarding the method for applying the coating composition, there is no particular limitation, and a known coating method may be used. Examples of coating methods include a microgravure coating method, a wire bar coating method, a direct gravure coating method, a die coating method, a dipping method, a spray coating method, a reverse-roll coating method, a curtain coating method, a comma coating method, a knife coating method, and a spin coating method.

Regarding the thickness of the coating composition applied, the solids content of the coating composition is appropriately controlled and applied so that the dried average thickness becomes 3 to 30 μm, preferably 4 to 15 μm. When the thickness is smaller than the above range, it is difficult to obtain a desired hardness, and, when the thickness is larger than the above range, the resultant film is likely to suffer marked curling.

After the coating, the coating composition applied is dried at a high temperature to volatilize the solvent. Convection caused in the coating composition during the drying forms Benard Cells, enabling the surface of the anti-glare layer 12 to have moderately sloping irregularities having an appropriate period. In the anti-glare film 2 according to a second embodiment, a desired surface shape is obtained not by, for example, uniformly dispersing the individual fine particles 13 but by permitting a plurality of fine particles 13 to be appropriately agglomerated due to the convection to form one diffuser element. The drying temperature and drying time may be appropriately determined depending on the boiling point of the solvent contained in the coating composition. In this case, it is preferred to select the drying temperature and drying time so that the substrate 11 does not suffer deformation due to heat shrinkage while considering the heat resistance of the substrate 11. Further, it is preferred to control the conditions for drying and others so that appropriate convection is caused in an ionizing radiation curing resin to produce a desired surface shape.

The drying step and curing step are described below in detail.

The coating composition applied to the substrate 11 is first dried at a predetermined temperature to cause convection in the coating composition so that the fine particles 13 are appropriately agglomerated in the in-plane direction due to the convection, forming two-dimensional aggregates. In this instance, the solvent is volatilized, and Benard Cells are formed in the surface of the applied film. When the fine particles 13 are stacked on one another in the thicknesswise direction of the applied film to form three-dimensional agglomerations, components having sharp angles are disadvantageously formed in the surface of the anti-glare layer, thus increasing the appearance of white muddiness.

The term "Benard Cells" used herein means a surface structure formed due to a convection phenomenon or convection caused in the coating composition in the drying step for solvent. All of the surface structures formed during the process for drying the solvent are referred to as "Benard Cells" used herein, and they have arbitrary forms, and are not limited to a tubular structure.

The degree of the agglomeration of the fine particles 13 may be selected by appropriately controlling, for example, the surface tension of the solvent and the surface energy of the fine particles 13.

It is preferred that the resin contained in the coating composition is also in the liquid state after drying the coating composition. In this case, meniscuses can be formed between the Benard Cells, making it possible to produce moderately sloping fine irregularities in the surface of the applied film.

Regarding the conditions for drying, there is no particular limitation, and there may be employed either air drying or artificial drying in which the drying temperature or drying time is controlled. When a stream of air is sent to the surface of the coating composition during the drying, it is preferred that a wind-wrought pattern is not caused in the surface of the applied film. When a wind-wrought pattern is caused, desired moderately sloping fine irregularities is unlikely to be formed in the surface of the anti-glare layer, thus making it difficult to achieve both the anti-glare properties and high contrast.

Next, the dried resin on the substrate 11 is cured by, i.e., ionizing radiation or heating. Thus a waviness with a large period are formed such that one two-dimensional agglomeration constitutes one peak. That is, fine irregularities having a broad period and a moderate slope, as compared to irregularities in a film currently manufactured, are formed in the surface of the anti-glare layer 12.

Examples of curing energy sources used for curing an ionizing radiation-curable resin to form the anti-glare layer 12 include an electron beam, ultraviolet light, visible light, and a gamma ray, but, from the viewpoint of the productive facilities, preferred is ultraviolet light. Regarding the ultraviolet light source, there is no particular limitation, and a high-pressure mercury lamp, a metal halide lamp, or the like is appropriately selected. Regarding the amount of total irradiation, there may be appropriately selected an amount of total irradiation such that the resin used is cured and the resin and the substrate 11 do not suffer yellowing. The atmosphere for irradiation may be appropriately selected depending on the curing of the resin, and the irradiation may be performed in air or in an inert atmosphere of nitrogen gas, argon gas, or the like.

The anti-glare film 1 prepared by the above method has specific diffuse reflection characteristics as described above, and hence suppresses the appearance of white muddiness while achieving anti-glare properties. Further, the anti-glare film has a specific space between the diffuser elements formed in the surface of the anti-glare layer 12, and hence has reduced rough surface appearance. Therefore, by using the anti-glare film 1 in a display device, such as a liquid crystal display, a plasma display, an electroluminescence display, or a CRT display, display achieving both excellent anti-glare properties and excellent contrast can be realized, thus improving the visibility.

(3) Third Embodiment (3-1) Configuration of Anti-Glare Film

Figure 6:
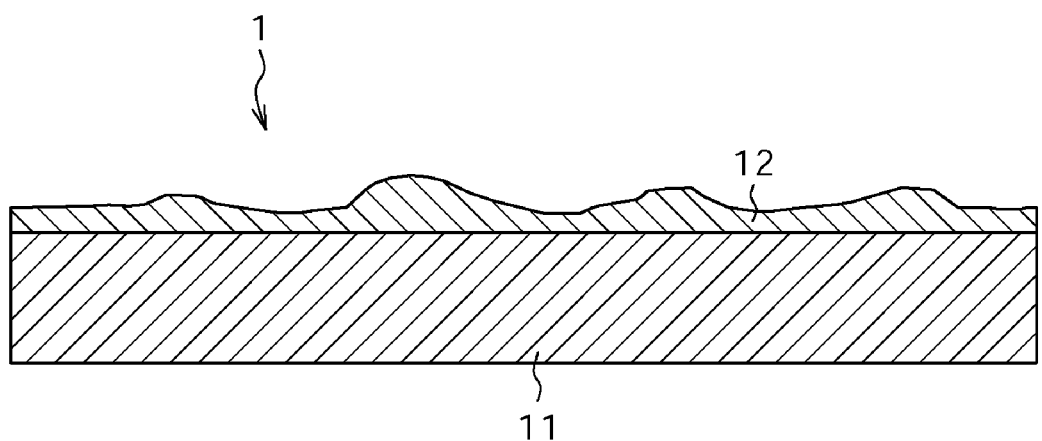
FIG. 6 is an enlarged cross-sectional view showing an example of the configuration of an anti-glare film according to a third embodiment.

As shown in FIG. 6, an anti-glare film 1 according to a third embodiment includes an anti-glare layer 12 formed on a substrate 11, and a plurality of protuberances are formed as diffuser elements in the surface of the anti-glare layer 12, and the surface collectively has fine irregularities. The fine irregularities in the surface of the anti-glare layer 12 are formed by a shape transfer method using a duplicate master prepared from a mother die formed by microfabrication. The substrate 11, diffuse reflection characteristics, and average space between the diffuser elements in a third embodiment are similar to those in first and second embodiments, and therefore the descriptions of them are omitted.

The anti-glare layer 12 in a third embodiment is formed from a resin including an ionizing radiation-curable resin or thermoplastic resin similar to that in first and second embodiments. Desired irregularities in the surface of the anti-glare layer 12 are obtained by, using a duplicate master as described below, transfer of irregularities in the mold surface. The anti-glare layer 12 does not necessarily contain fine particles 13, but it may contain them for finely controlling the haze or surface shape.

(3-2) Method for Manufacturing an Anti-Glare Film

A method for manufacturing the anti-glare film 1 according to a third embodiment is described below with reference to FIGS. 7A to 7E.

Process for Preparing a Mother Die

Figure 7A:
FIGS. 7A to 7E are cross-sectional views showing an example of the process for manufacturing an anti-glare film according to a third embodiment.

A base material to be processed is first prepared. Examples of forms of the base material include a substrate form, a sheet form, a film form, and a block form. Examples of materials for the base material include plastics, metals, and glass. Then, the base material is processed using a mask imaging method using, e.g., a KrF excimer laser, a pressing method, a method using a stamper for molding, a cutting method, a sandblasting method, a wet etching method, or the like to pattern in the surface of the base material fine irregularities corresponding to the surface of the anti-glare layer 12, obtaining a mother die 21 having an inverse fine irregularities of the shape in the anti-glare layer 12 as shown in FIG. 7A. The surface of the mother die 21 has fine irregularities such that the anti-glare film 1 according to a third embodiment can achieve diffuse reflection characteristics similar to those in first and second embodiments, and preferably has an average peak-valley space Sm of 300 μm or less, more preferably 220 μm or less.

Process for Preparing a Duplicate Master

Figure 7B:
Figure 7C:

Next, a conducting film is formed on the fine irregularities of the above-obtained mother die 21 by, for example, an electroless plating method. The conducting film is a metal film composed of a metal, such as nickel. Then, the mother die 21 having an electrically conductive film formed thereon is set in an electroforming apparatus, and a metal plating layer, such as a nickel plating layer, is formed on the electrically conductive film by, for example, an electroplating method. The metal plating layer is then released from the mother die 21, obtaining a duplicate master 22 having an inverse fine irregularities of the shape in the mother die 21 as shown in FIG. 7B.

Then, the duplicate master 22 obtained as described above is subjected to surface treatment, and then a metal plating layer, such as a nickel plating layer, is formed on the fine irregularities of the resultant duplicate master by, for example, an electroplating method. The metal plating layer is then released from the duplicate master 22, obtaining a duplicate master 23 having the same fine irregularities as that of the mother die 21 as shown in FIG. 5C.

When the mother die is composed of an organic substance or the like, which is likely to be damaged, a child mold and a grandchild mold are prepared from the mother die as described above, and a grandchild mold may be prepared in a great amount using the child mold even when the mother die is damaged upon releasing the mother die. On the other hand, when the mother die is unlikely to be damaged and a child mold may be repeatedly prepared from the mother die, the mother die is processed so that it has the same shape as that of the anti-glare layer and the resultant reverse child mold may be used as a transfer mold.

Process for Preparing an Anti-Glare Layer

Next, a photosensitive resin, such as an ultraviolet-curable resin, is poured onto the fine irregularities of the duplicate master 23 obtained by the above processes. As a photosensitive resin forming the anti-glare layer 12, for example, a resin similar to that used in a first embodiment may be used. The fine irregularities of the anti-glare layer 12 is obtained by shape transfer, and hence it is not necessary to add fine particles to the photosensitive resin, but fine particles may be added to the photosensitive resin for finely controlling the haze or surface shape.

Figure 7D:
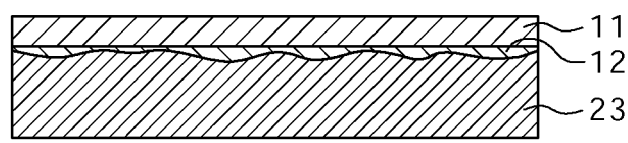
Figure 7E:
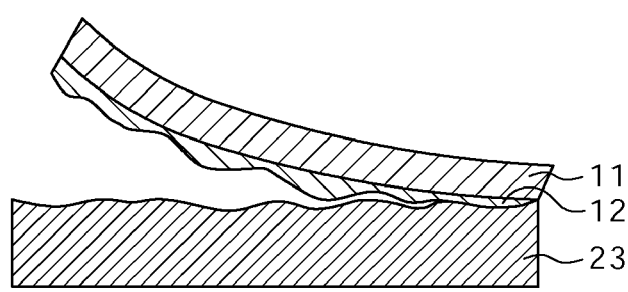

Then, as shown in FIG. 7D, a substrate 11 as a support substrate is put on the duplicate master 23. Subsequently, force is applied to the substrate 11 by means of, e.g., a rubber roller so that the thickness of the photosensitive resin becomes uniform. Then, for example, the photosensitive resin is cured by irradiating, e.g., the substrate 11 with a ray of light, such as ultraviolet light. Then, as shown in FIG. 7E, the cured photosensitive resin is released from the duplicate master 23. Thus, an anti-glare layer 12 is formed on one principal surface of the substrate 11, preparing an anti-glare film 1 having the diffuse reflection characteristics as described above.

Figure 8:
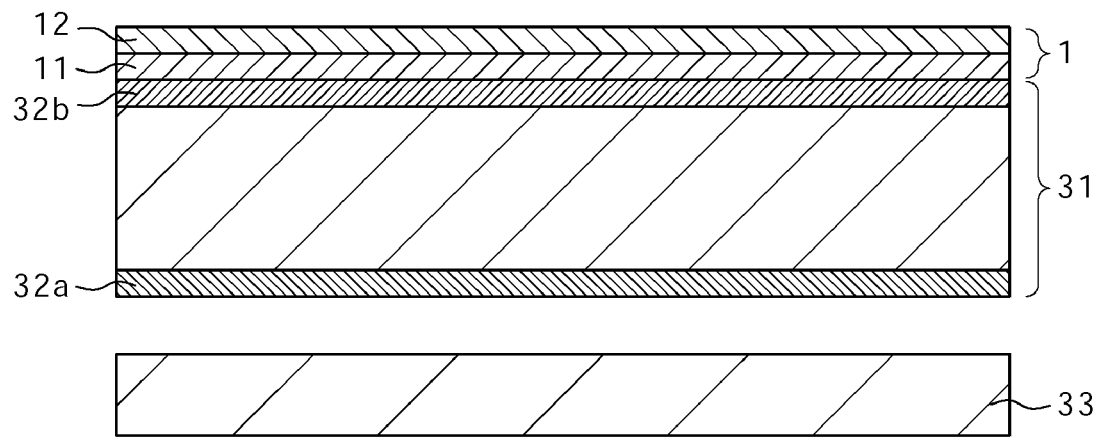
FIG. 8 is a view showing an example of the configuration of a liquid crystal display device using an anti-glare film according to a third embodiment.

FIG. 8 is a view showing an example of the configuration of a liquid crystal display device using the anti-glare film 1 according to a third embodiment. The liquid crystal display device includes, as shown in FIG. 8, a liquid crystal panel 31, and a light source 33 provided under the liquid crystal panel 31, and the liquid crystal panel 31 has the anti-glare film 1 on the display side thereof.

The light source 33 supplies light to the liquid crystal panel 31, and has, e.g., a fluorescent lamp (FL), electroluminescence (EL), or a light emitting diode (LED). The liquid crystal panel 31 spatially modulates the light supplied by the light source 33 to display information. On both surfaces of the liquid crystal panel 31 are provided polarizer sheets 32a, 32b. The polarizer sheet 32a and polarizer sheet 32b permit one of the polarized light components perpendicular to each other with respect to the incident light to pass through the sheets and shut out another by absorption. The polarizer sheet 32a and polarizer sheet 32b are arranged so that, for example, their transmission axes are perpendicular to each other.

The anti-glare film 1 according to a third embodiment has specific diffuse reflection characteristics as described above, and hence has suppressed appearance of white muddiness while achieving anti-glare properties. Further, the anti-glare film has a specific space between the diffuser elements formed in the surface of the anti-glare layer 12, and hence has reduced rough surface appearance. Therefore, by using the anti-glare film 1 in a liquid crystal display device, an image displayed on the liquid crystal display device can be improved in visibility.

EXAMPLES

Hereinbelow, embodiments will be described in more detail with reference to the following Examples, which should not be construed as limiting the scope of the present application. Examples 1 to 7 and 9 correspond to a second embodiment of the present application, and Example 8 corresponds to a third embodiment of the present application.

Example 1

Raw materials having the formulation for coating composition shown below were mixed together and stirred by means of a magnetic stirrer for one hour, and then the resultant coating composition was applied to one surface of a triacetylcellulose (TAC) film having a thickness of 80 μm (manufactured and sold by Fuji Photo Film Co., Ltd.) by means of a bar coater.

| (Formulation of coating composition) | |
|---|---|
| Polyfunctional monomer | 100 Parts by weight |
| Polymer | 5 Parts by weight |
| Photopolymerization initiator (IRGACURE 184, manufactured and sold by CIBA-GEIGY) | 3 Parts by weight |
| Solvent (t-butanol) | 153 Parts by weight |
| Crosslinkable styrene beads SBX6 (manufactured and sold by SEKISUI PLASTICS CO., LTD.) | 10 Parts by weight |

After applying, the coating composition applied was dried in a drying oven at 80° C. for two minutes, and then subjected to curing treatment by irradiation with ultraviolet light at 100 mJ/cm2 to obtain an anti-glare film in Example 1 in which the dried thickness of the anti-glare layer was 11.8 μm.

Example 2

An anti-glare film in Example 2 was obtained in substantially the same manner as in Example 1 except that the amount of crosslinkable styrene beads SBX6 (manufactured and sold by SEKISUI PLASTICS CO., LTD.) was changed to 3 parts by weight, and that the dried thickness of the anti-glare layer was 11.0 μm.

Example 3

An anti-glare film in Example 3 was obtained in substantially the same manner as in Example 1 except that the amount of crosslinkable styrene beads SBX6 (manufactured and sold by SEKISUI PLASTICS CO., LTD.) was changed to 5 parts by weight, that the amount of the solvent (t-butanol) was changed to 156 parts by weight, and that the dried thickness of the anti-glare layer was 9.4 μm.

Example 4

An anti-glare film in Example 4 was obtained in substantially the same manner as in Example 1 except that, instead of crosslinkable styrene beads SBX6 (manufactured and sold by SEKISUI PLASTICS CO., LTD.), 3 parts by weight of crosslinkable styrene beads SBX4 (manufactured and sold by SEKISUI PLASTICS CO., LTD.) were used, and that the dried thickness of the anti-glare layer was 4.7 μm.

Example 5

An anti-glare film in Example 5 was obtained in substantially the same manner as in Example 1 except that, instead of crosslinkable styrene beads SBX6 (manufactured and sold by SEKISUI PLASTICS CO., LTD.), 5 parts by weight of crosslinkable styrene beads SX500 (manufactured and sold by Soken Chemical & Engineering Co., Ltd.) were used, that the amount of the solvent (t-butanol) was changed to 156 parts by weight, and that the dried thickness of the anti-glare layer was 9.7 μm.

Example 6

In Example 1, 10 parts by weight of crosslinkable styrene beads SBX6 (manufactured and sold by SEKISUI PLASTICS CO., LTD.) and 163 parts by weight of a solvent (t-butanol) were mixed together, obtaining an anti-glare film in which the dried thickness of the anti-glare layer was 12.3 μm. Then, to the resultant anti-glare film was applied a coating composition prepared by mixing together raw materials having the formulation for coating composition shown below, obtaining an anti-glare film in Example 6 having two layers.

| (Formulation of coating composition) | |
| --- | --- |
| Polyfunctional monomer | 100 Parts by weight |
| Polymer | 5 Parts by weight |
| Photopolymerization initiator (IRGACURE 184, manufactured and sold by CIBA-GEIGY) | 3 Parts by weight |
| Solvent (t-butanol) | 149 Parts by weight |

Example 7

An anti-glare film in Example 7 was obtained in substantially the same manner as in Example 2 except that the coating composition was applied to one surface of a polyethylene terephthalate (PET) film having a thickness of 100 μm (COSMOSHINE A4300, manufactured and sold by TOYOBO CO., LTD.), and that the dried thickness of the anti-glare layer was 10.9 μm.

Example 8

A mother die was prepared by a mask imaging method using a KrF excimer laser, and a nickel plating layer was formed on the mother die, and then released from the mother die to prepare a first duplicate master. Then, a nickel plating layer was formed on the first duplicate master, and then released from the first duplicate master to prepare a second duplicate master. A coating composition having the formulation shown below was applied onto the second duplicate master, and a polyethylene terephthalate (PET) film having a thickness of 75 μm (COSMOSHINE A4300, manufactured and sold by TOYOBO CO., LTD.) was put on the coating composition, and a load of 1 kg was applied to the film on the coating composition by means of a rubber roller so that the thickness of the coating composition became uniform. Subsequently, the polyethylene terephthalate (PET) film was irradiated with ultraviolet light at 500 mJ/cm2 to cure the ultraviolet curing resin, and then the ultraviolet curing resin was released from the second duplicate master to obtain an anti-glare film in Example 8. The dried thickness of the anti-glare layer was 5.5 μm.

| (Formulation of coating composition) | |
| --- | --- |
| Polyfunctional monomer | 100 Parts by weight |
| Polymer | 5 Parts by weight |
| Photopolymerization initiator (IRGACURE 184, manufactured and sold by CIBA-GEIGY) | 3 Parts by weight |
| Solvent (t-butanol) | 149 Parts by weight |

Example 9

An anti-glare film was obtained in substantially the same manner as in Example 1 except that raw materials having the formulation for coating composition shown below were mixed together, and that the dried thickness of the anti-glare layer was 7.3 μm.

| (Formulation of coating composition) | |
| --- | --- |
| Polyfunctional acrylic oligomer | 100 Parts by weight |
| Photopolymerization initiator (IRGACURE 184, manufactured and sold by CIBA-GEIGY) | 3 Parts by weight |
| Solvent (methyl isobutyl ketone; MIBK) | 150 Parts by weight |
| Propylene glycol monomethyl ether (PGM) | 37 Parts by weight |
| Silica beads SS50B (manufactured and sold by TOSOH SILICA CORPORATION) | 12 Parts by weight |
| Dispersant DOPA15 (manufactured and sold by Shin-Etsu Chemical Co., Ltd.) | 10 Parts by weight |

Comparative Example 1

An anti-glare film in Comparative Example 1 was obtained in substantially the same manner as in Example 2 except that the dried thickness of the anti-glare layer was 6.8 μm.

Comparative Example 2

An anti-glare film in Comparative Example 2 was obtained in substantially the same manner as in Example 2 except that the dried thickness of the anti-glare layer was 7.6 μm.

Comparative Example 3

An anti-glare film in Comparative Example 3 was obtained in substantially the same manner as in Example 1 except that, instead of crosslinkable styrene beads SBX6 (manufactured and sold by SEKISUI PLASTICS CO., LTD.), 3 parts by weight of crosslinkable styrene beads SX500 (manufactured and sold by Soken Chemical & Engineering Co., Ltd.) were used, and that the dried thickness of the anti-glare layer was 8.5 μm.

Comparative Example 4

An anti-glare film in Comparative Example 4 was obtained in substantially the same manner as in Example 1 except that, instead of crosslinkable styrene beads SBX6 (manufactured and sold by SEKISUI PLASTICS CO., LTD.), 5 parts by weight of crosslinkable styrene beads SX500 (manufactured and sold by Soken Chemical & Engineering Co., Ltd.) were used, and that the dried thickness of the anti-glare layer was 11.2 μm.

Comparative Example 5

An anti-glare film in Comparative Example 5 was obtained in substantially the same manner as in Example 1 except that, instead of crosslinkable styrene beads SBX6 (manufactured and sold by SEKISUI PLASTICS CO., LTD.), 5 parts by weight of crosslinkable styrene beads SBX12 (manufactured and sold by SEKISUI PLASTICS CO., LTD.) were used, and that the dried thickness of the anti-glare layer was 18.7 μm.

With respect to each of the anti-glare films prepared in Examples 1 to 9 and Comparative Examples 1 to 5, optical properties were evaluated by the methods shown below.

Evaluation of Diffuse Reflection Characteristics

For removing the effect of reflection off the back surface to determine diffuse reflection characteristics of the anti-glare film per se, the back surface of each of the anti-glare films prepared in Examples 1 to 9 and Comparative Examples 1 to 5 was attached to black glass through an adhesive. The diffuse reflection characteristics were evaluated by determining a reflected light intensity under dark room conditions using a goniophotometer GP-1-3D (manufactured and sold by OPTEC Co., Ltd.) by scanning the collimated incident light upon the sample surface in the −5° direction from −5° to 30° wherein the specular reflection direction was 0°. In this instance, a luminance meter in the goniophotometer had a 2° field of view.

Figure 9:
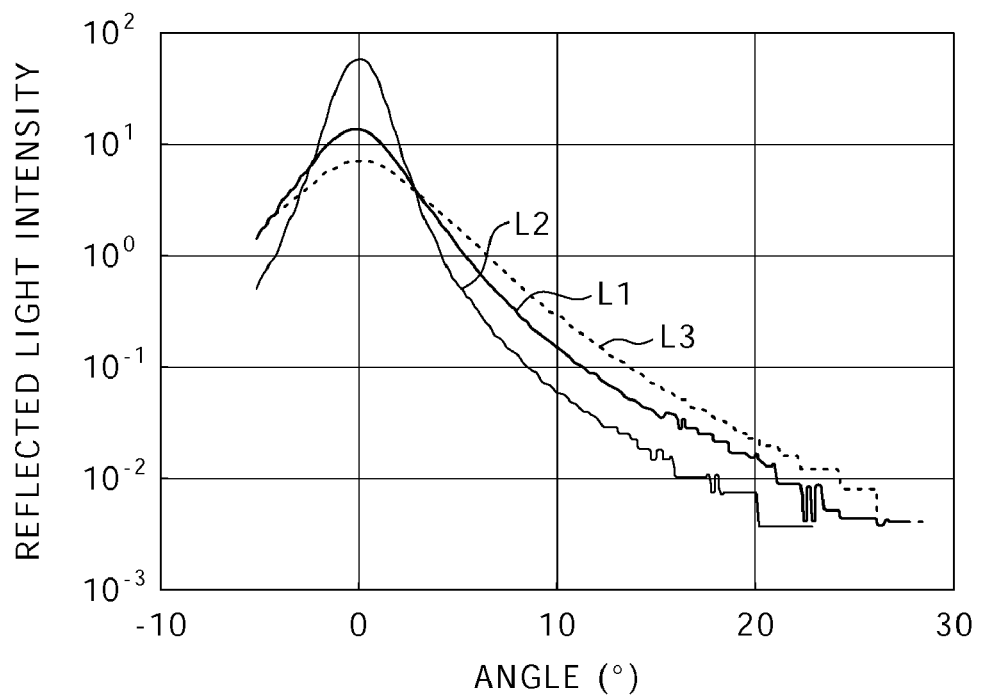
FIG. 9 is a graph showing the diffuse reflection characteristics in Examples 1 and 2 and Comparative Example 2.
Figure 10:
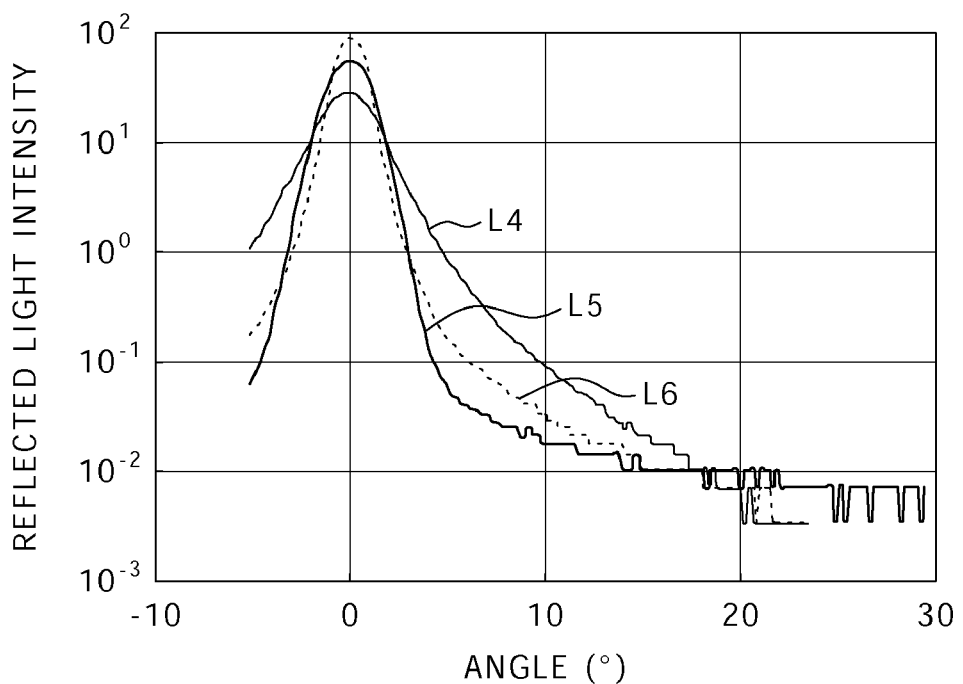
FIG. 10 is a graph showing the diffuse reflection characteristics in Examples 3 and 6 and Comparative Example 4.

Graphs showing the respective diffuse reflection characteristics in Examples 1 and 2 and Comparative Example 2 are shown in FIG. 9. In FIG. 9, L1 corresponds to Example 1, L2 corresponds to Example 2, and L3 corresponds to Comparative Example 2. Graphs showing the respective diffuse reflection characteristics in Examples 3 and 6 and Comparative Example 4 are shown in FIG. 10. In FIG. 10, L4 corresponds to Example 3, L5 corresponds to Example 6, and L6 corresponds to Comparative Example 4. Items of evaluation of the diffuse reflection characteristics are as follows. An $I(\alpha+1)/I(\alpha)$ ratio was determined wherein $I(\alpha)$ is an intensity of the reflected light at an arbitrary angle $\alpha$ and $I(\alpha+1)$ is an intensity of the reflected light at the angle $\alpha$ by 1° in a wide-angle direction, and a maximum value of the ratio for the reflected light intensity was determined as maximum change of intensity per 1°. Full widths of angle at the ½, ¹⁄₁₀₀, and ¹⁄₁,₀₀₀ reflected light intensity with respect to the peak of reflected light intensity were individually determined. A gain was determined by standardizing the reflected light intensity in the direction at 20° with respect to the specular reflection direction of each of the anti-glare films in Examples 1 to 9 and Comparative Examples 1 to 5 using as 1 an intensity of the light reflected in the specular reflection direction measured using a standard diffuser plate composed of barium sulfate in the same evaluation.

Measurement of Haze

A haze was measured under the conditions for measurement described in JIS K7136 using a haze meter HM-150 (manufactured and sold by MURAKAMI COLOR RESEARCH LABORATORY). A haze was measured with respect to the anti-glare films in Examples 1 to 9 and Comparative Examples 1 to 5, and a haze was measured with respect to anti-glare films obtained by attaching an adhesive having a haze of 1% or less to the surface of the anti-glare layer of the above anti-glare films, and the latter was defined as an internal haze, and a difference between the former and the latter was determined as a surface haze.

Measurement of Average Space Between Diffuser Elements

Regarding each of the anti-glare films in Examples 1 to 9 and Comparative Examples 1 to 5, surface roughness was measured under the conditions for measurement described in JIS B0601-1994 using Automatic Microfigure Measuring Instrument SURFCORDER ET4000A (manufactured and sold by Kosaka Laboratory Ltd.), and a roughness curve was obtained from the resultant two-dimensional cross-sectional curve. As a roughness parameter, an average length Sm of the trimming curve was determined by making a calculation, determining an average space between the diffuser elements.

Evaluation of Anti-Glare Properties

Regarding each of the anti-glare films prepared in Examples 1 to 9 and Comparative Examples 1 to 5, for removing the effect of reflection off the back surface to evaluate anti-glare properties of the anti-glare film per se, the back surface of the anti-glare film was attached to black glass through an adhesive. Then, a fluorescent lighting having two unshaded fluorescent lamps disposed in parallel was used as a light source, and a reflection in each anti-glare film was checked by visual observation from the specular reflection direction, and the reflection of the fluorescent lighting was evaluated in accordance with the following criteria.

A: Edges of the fluorescent lamps cannot be seen. (The two fluorescent lamps are seen as single light.)

B: The fluorescent lamps can be seen to some extent, but the edges are not distinct.

C: The fluorescent lamps are directly reflected.

Evaluation of the Degree of White Muddiness

The appearance of white muddiness is perceived by detecting diffused light as a light source, such as a fluorescent lighting, which has been diffused by and reflected off the surface of an anti-glare layer. Therefore, a value quantitatively determined by simulating the above phenomenon using a commercially available spectrocolorimeter was used as a degree of white muddiness. A specific method for measuring the degree of white muddiness is as follows. First, with respect to each of the anti-glare films prepared in Examples 1 to 9 and Comparative Examples 1 to 5, for removing the effect of reflection off the back surface to evaluate diffuse reflection of the anti-glare film per se, the back surface was attached to black glass through an adhesive. Then, using an integrating sphere type spectrocolorimeter SP64 (manufactured and sold by X-Rite, Incorporated), a d/8° optical system was employed in which the surface of each anti-glare film was irradiated with diffused light and the reflected light was measured by a detector positioned in the direction at 8° with the normal to the anti-glare film. With respect to the measured value, an SPEX mode in which only the diffuse reflection component was detected, excluding the specular reflection component, was employed, and the measurement was conducted at a detection view angle of 2°. Experiments have confirmed that there is a correlation between a degree of white muddiness measured by the above method and the degree of white muddiness visually sensed.

With respect to each of the anti-glare films prepared in Examples 1 to 9 and Comparative Examples 1 to 5, the back surface was attached to a black acrylic sheet (ACRYLITE L 502, manufactured and sold by Mitsubishi Rayon Co., Ltd.) through an adhesive, and a degree of white muddiness in the resultant anti-glare film was measured in the same manner as in the method for measurement using black glass. A degree of white muddiness measured for the black acrylic sheet having no anti-glare film attached was 0.2.

Figure 11:
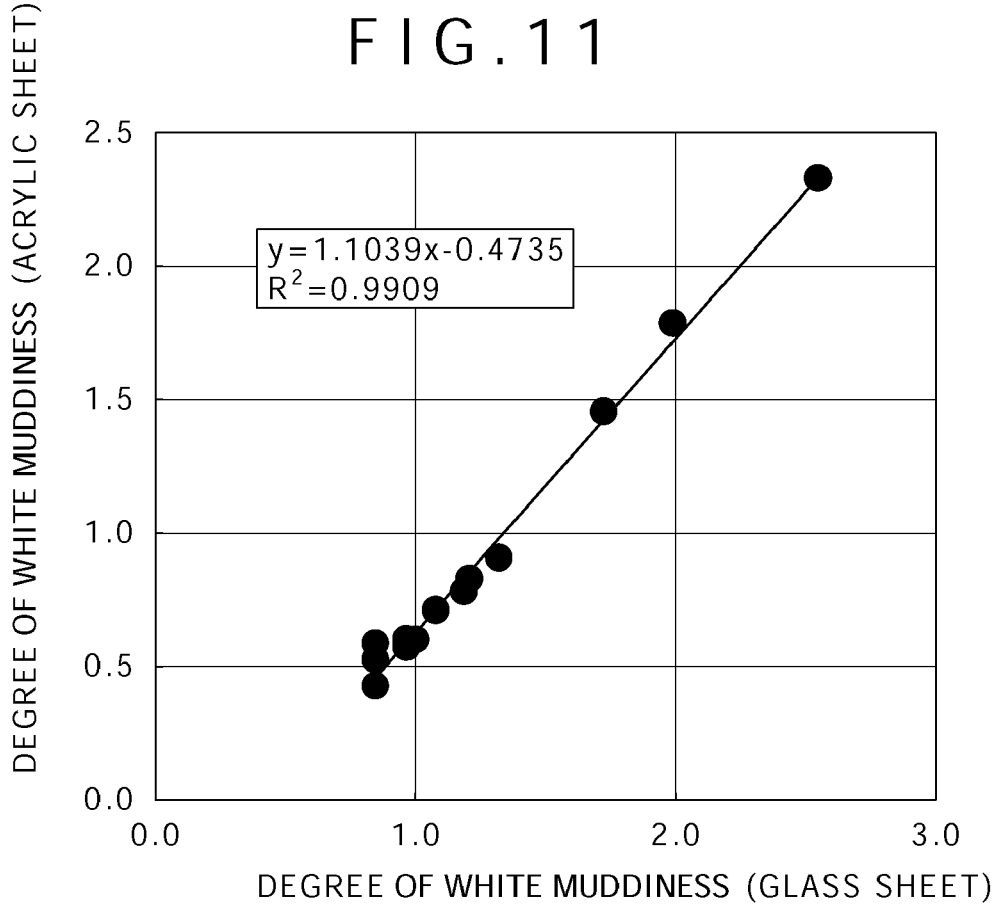
FIG. 11 is a graph for explaining the correlation between degree of white muddiness as measured using a black glass sheet and degree of white muddiness as measured using a black acrylic sheet.

A correlation between the degree of white muddiness measured for the anti-glare film having black glass attached and the degree of white muddiness measured for the anti-glare film having a black acrylic sheet attached is described with reference to Table 1 and FIG. 11.

TABLE 1

|  | Degree of white muddiness (measured) for glass sheet | Degree of white muddiness (measured) for acrylic sheet | Degree of white muddiness (calculated) for acrylic sheet |
| --- | --- | --- | --- |
| Sample 1 | 2.6 | 2.3 | 2.3 |
| Sample 2 | 2.0 | 1.8 | 1.7 |
| Sample 3 | 0.9 | 0.5 | 0.5 |
| Sample 4 | 0.9 | 0.6 | 0.5 |
| Sample 5 | 1.0 | 0.6 | 0.6 |
| Sample 6 | 1.0 | 0.6 | 0.6 |

TABLE 1-continued

| | Degree of white muddiness (measured) for glass sheet | Degree of white muddiness (measured) for acrylic sheet | Degree of white muddiness (calculated) for acrylic sheet |
|---|---|---|---|
| Sample 7 | 1.7 | 1.5 | 1.4 |
| Sample 8 | 1.2 | 0.8 | 0.9 |
| Sample 9 | 1.3 | 0.9 | 1.0 |
| Sample 10 | 1.1 | 0.7 | 0.7 |
| Sample 11 | 1.2 | 0.8 | 0.8 |
| Sample 12 | 1.0 | 0.6 | 0.6 |
| Sample 13 | 1.0 | 0.6 | 0.6 |
| Sample 14 | 0.9 | 0.4 | 0.5 |

With respect to samples 1 to 14 of anti-glare films obtained by changing the degree of white muddiness by appropriately controlling the thickness and particle diameter in the same preparation method as in Example 1, the results of measurement of the degree of white muddiness for the samples having a black glass sheet attached and for the samples having a black acrylic sheet attached are shown in Table 1. In addition, with respect to the degree of white muddiness for the samples having an acrylic sheet attached, values determined by making a calculation using a regression line obtained from the correlation between a black glass sheet and a black acrylic sheet are shown in Table 1. As can be seen from Table 1, values near the measured values can be obtained by the calculation.

A regression line from the correlation between a black glass and a black acrylic sheet is obtained by, as shown in FIG. 9, plotting a degree of white muddiness for a sample having a black glass bonded on the abscissa and a degree of white muddiness for a sample having a black acrylic sheet bonded on the ordinate. In FIG. 9, when a degree of white muddiness for a sample having a glass sheet attached is taken as x and a degree of white muddiness for a sample having an acrylic sheet attached is taken as y, a regression line represented by the following formula:

$$y = 1.1039x - 0.4735$$

is obtained, and a determining coefficient R2 is 0.9909. From the above, it is found that there is a close correlation between a degree of white muddiness as measured using a black glass and a degree of white muddiness as measured using a black acrylic sheet.

Evaluation of Rough Surface Appearance

With respect to each of the anti-glare films prepared in Examples 1 to 9 and Comparative Examples 1 to 5, for removing the effect of reflection off the back surface to evaluate rough surface appearance of the anti-glare film, the back surface of the anti-glare film was attached to black glass through an adhesive. Then, the anti-glare film was irradiated with light in the direction at about 30° with respect to the normal to the anti-glare film using a light box (manufactured and sold by HAKUBA Photo Industry Co., Ltd.) as a plane light source, and a reflection in each anti-glare film was checked by visual observation from the specular reflection direction, and the rough surface appearance was evaluated in accordance with the following criteria.

⊚: Rough surface appearance is not visually perceived even at a position about 50 centimeters from the anti-glare film.

○: Rough surface appearance is not visually perceived at a position 1 meter from the anti-glare film, but rough surface appearance is visually perceived at a position about 50 centimeters from the film.

x: Rough surface appearance is visually perceived at a position 1 meter from the anti-glare film.

The results of the evaluation of the optical properties for Examples 1 to 9 and Comparative Examples 1 to 5 are shown in Table 2. With respect to the degree of white muddiness, the results of evaluation for the anti-glare films having black glass attached and the results of evaluation for the anti-glare films having a black acrylic sheet bonded are shown.

TABLE 2

| | Maximum change of intensity per 1° | Full width of angle at 1/2 intensity (°) | Full width of angle at 1/100 intensity (°) | Full width of angle at 1/1,000 intensity (°) | Gain at 20° from specular reflection direction | Internal haze (%) | Surface haze (%) | Average space between diffuser elements (μm) | Anti-glare properties | Degree of white muddiness | | Rough surface appearance |
|---|---|---|---|---|---|---|---|---|---|---|---|---|
| | | | | | | | | | | Glass sheet | Acrylic sheet | |
| Example 1 | 0.56 | 4.2 | 22.2 | 40.9 | 0.018 | 40.1 | 4.5 | 81 | B | 1.9 | 1.6 | ⊚ |
| Example 2 | 0.29 | 2.4 | 9.8 | 19.8 | 0.004 | 15.5 | 0.2 | 204 | B | 1.1 | 0.7 | ⊚ |
| Example 3 | 0.42 | 3.0 | 14.4 | 29.2 | 0.007 | 17.0 | 3.0 | 258 | B | 1.6 | 1.3 | ○ |
| Example 4 | 0.11 | 2.0 | 7.9 | 17.4 | 0.011 | 8.0 | 2.1 | 171 | B | 1.2 | 0.9 | ⊚ |
| Example 5 | 0.22 | 1.9 | 7.7 | 16.7 | 0.007 | 20.6 | 1.8 | 216 | B | 1.0 | 0.6 | ⊚ |
| Example 6 | 0.13 | 2.4 | 6.7 | 10.4 | 0.007 | 37.4 | 2.8 | 194 | B | 0.9 | 0.5 | ⊚ |
| Example 7 | 0.28 | 2.4 | 9.8 | 20.0 | 0.005 | 14.9 | 0.5 | 223 | B | 1.1 | 0.7 | ○ |
| Example 8 | 0.26 | 2.2 | 8.2 | 15.8 | 0.002 | 0.5 | 0.7 | 126 | B | 1.0 | 0.6 | ⊚ |
| Example 9 | 0.11 | 1.8 | 6.2 | 13.2 | 0.011 | 0.8 | 0.0 | 172 | B | 0.9 | 0.5 | ⊚ |
| Comparative Example 1 | 0.75 | 7.6 | 36.8 | 54.0 | 0.029 | 13.8 | 12.9 | 164 | A | 3.3 | 3.2 | ⊚ |
| Comparative Example 2 | 0.67 | 6.0 | 28.8 | 46.0 | 0.021 | 13.6 | 5.7 | 110 | A | 2.8 | 2.6 | ⊚ |
| Comparative Example 3 | 0.07 | 1.8 | 5.4 | 9.0 | 0.002 | 14.1 | 0.2 | 210 | C | 0.9 | 0.5 | X |
| Comparative Example 4 | 0.08 | 1.7 | 5.8 | 9.7 | 0.002 | 23.1 | 0.3 | 199 | C | 0.9 | 0.5 | X |
| Comparative Example 5 | 0.24 | 2.1 | 8.8 | 18.4 | 0.072 | 20.9 | 0.1 | 339 | B | 1.2 | 0.9 | X |

Attention is drawn to the maximum change of intensity per 1° shown in Table 2. In each of Examples 1 to 9 in which the maximum change of intensity per 1° is more than 0.1, the edges of the fluorescent lamps were not distinct in the evaluation of anti-glare properties, and hence each film is rated rank B, and is found to have appropriate anti-glare properties. By contrast, in Comparative Examples 3 and 4 in which the maximum change of intensity per 1° is 0.1 or less, a reflection of the fluorescent lighting was observed in the evaluation of anti-glare properties, and the films did not have satisfactory anti-glare properties. From the above results, it has been found that, for achieving anti-glare properties, the maximum change of intensity per 1° is more than 0.1. In Comparative Examples 1 and 2 in which the maximum change of intensity per 1° is more than 0.1, the films had excellent anti-glare properties, but they had a gain at 20° as high as 0.02 or more and had a strong appearance of white muddiness. From this, it has been found that the maximum change of intensity per 1° is preferably 0.6 or less.

Next, attention is drawn to the full width of angle at the $1/100$ reflected light intensity. In each of Examples 1 to 9 in which the full width of angle is 6.0° or more, each film achieved appropriate anti-glare properties. By contrast, in Comparative Examples 3 and 4 in which the full width of angle is less than 6.0°, a reflection of the fluorescent lighting was observed in the evaluation of anti-glare properties by visual observation, and the films did not have satisfactory anti-glare properties. In Comparative Examples 1 and 2 in which the full width of angle is more than 28.0°, the films had excellent anti-glare properties, but they had a gain at 20° of more than 0.02 and had strong appearance of white muddiness. From the above results, it has been found that, for achieving anti-glare properties, the full width of angle at the $1/100$ reflected light intensity must be 6.0° to 28.0°.

Attention is then drawn to the full width of angle at the $1/1,000$ reflected light intensity. In each of Examples 1 to 9 in which the full width of angle is 10.0° or more, each film achieved appropriate anti-glare properties. By contrast, in Comparative Examples 3 and 4 in which the full width of angle is less than 10.0°, a reflection of the fluorescent lighting was observed in the evaluation of anti-glare properties by visual observation, and the films did not have satisfactory anti-glare properties. In Comparative Examples 1 and 2 in which the full width of angle is more than 45.0°, the films had excellent anti-glare properties, but they had a gain at 20° of more than 0.02 and had strong appearance of white muddiness. From the above results, it has been found that, for achieving anti-glare properties, the full width of angle at the $1/1,000$ reflected light intensity is be 10.0° to 45.0°.

Attention is drawn to the full width of angle at the $1/2$ reflected light intensity (half band width). Only Comparative Example 1 satisfies the requirement described in Japanese Unexamined Patent Application publication No. 2002-365410 that the half band width with respect to the peak of reflected light intensity be 7° or more, and the film achieved excellent anti-glare properties, but the film having a black acrylic sheet attached had a degree of white muddiness of higher than 1.7. From this, it has been found that it is difficult to achieve both excellent anti-glare properties and reduced degree of white muddiness. Further, from a comparison of Comparative Examples 3 and 4 in which the anti-glare properties are unsatisfactory with Example 5 in which appropriate anti-glare properties are achieved, no relationship in the half band width between them is found. From the above, it has been found that a film only having a specific full width of angle at the $1/2$ reflected light intensity cannot achieve anti-glare properties. The reason for this is presumed that there is a correlation between the visibility of a human and a logarithm of the intensity of light and hence the intensity of light must be gradually reduced to the $1/100$ or $1/1,000$ intensity.

The anti-glare films in Examples 1 to 9 having a gain at 20° of 0.02 or less and each having a black acrylic sheet bonded had a degree of white muddiness of 1.7 or less in respect of the degree of white muddiness evaluated by the d/8° reflectance excluding the specular reflection component. The anti-glare films in Examples 1 to 9 each having a black acrylic sheet attached had a degree of white muddiness of 1.7 or less, and had reduced black reflection, and therefore, when the films were actually used in the surface of a display, black was seen sharply. Further, the anti-glare films in Examples 2 and 4 to 9 each having a black acrylic sheet bonded had a degree of white muddiness of 1.2 or less, and had further reduced black reflection and were improved in contrast, imparting reality to the image. By contrast, the anti-glare films in Comparative Examples 1 and 2 having a gain at 20° of 0.02 or more had strong appearance of white muddiness.

In Comparative Examples 1 and 2 in which the appearance of white muddiness is strong, the surface haze is more than 5.0%. From this, it is found that the surface haze is preferably 0 to 5.0%. In each of Examples 2 to 9, the surface haze is 3.0% or less. From this, it is found that the surface haze is more preferably 0 to 3.0%. On the other hand, the internal haze is not particularly specified, and is determined by adding fine particles required for obtaining a surface shape which can achieve desired diffuse reflection characteristics.

Next, attention is drawn to the average space between the diffuser elements. Regarding each of the anti-glare films in Examples 1 to 9 having an average space of 300 μm or less, rough surface appearance was not perceived in a reflection at a position 1 meter (m) from the anti-glare film. Particularly, each of the anti-glare films in Examples 1, 2, 4 to 6, 8, and 9 having an average space of 220 μm or less had very fine surface characteristics such that rough surface appearance was not perceived even at a position about 50 centimeters (cm) from the anti-glare film. By contrast, regarding the anti-glare film in Comparative Example 5 having an average space of more than 330 μm, rough surface appearance was perceived, and the anti-glare film had no fine surface. Further, regarding the anti-glare films in Comparative Examples 3 and 4, each of which has an average space of 300 μm or less, but which does not satisfy the requirement for the diffuse reflection characteristics that the maximum change of intensity per 1° be more than 0.1 to 0.6, the full width of angle at the $1/100$ reflected light intensity be 6.0 to 28.0°, or the full width of angle at the $1/1,000$ reflected light intensity be 10.0° to 45.0°, serious rough surface appearance was perceived. The reason for this is presumed that some uneven portions are caused in a relatively even surface.

The rough surface appearance is easily perceived when the surfaces of the fine particles contained markedly protrude from the anti-glare layer composed of an ultraviolet-curable resin. Therefore, the rough surface appearance was further suppressed by covering the surfaces of the particles with an ionizing radiation-curable resin or the like to reduce the steep slope portions of the particles. In addition, for the same purpose, classification of the particles to be added to remove large-diameter particles was also effective.

The anti-glare films in Examples 1 to 9 and Comparative Examples 1 and 5 were individually applied to an image display device to check image light. In the anti-glare film in Comparative Example 5, marked scintillation called surface glare was observed, whereas, in each of the anti-glare films in Examples 1 to 9, almost no scintillation was observed.

From the above results, it is found out that an anti-glare film having, as diffuse reflection characteristics, a specific ratio of the intensity of the reflected light at an arbitrary angle of 10° or less from the specular reflection direction to the intensity of the reflected light deviated from the arbitrary angle by 1° in a wide-angle direction and a specific gain of the light reflected in the direction at 20° or more from the specular reflection direction has suppressed appearance of white muddiness while achieving anti-glare properties. Similarly, it is founded out that an anti-glare film having a specific full width of angle at the $1/100$ or $1/1,000$ reflected light intensity with respect to the peak of reflected light intensity and a specific gain of the light reflected in the direction at 20° or more from the specular reflection direction has lowered the appearance of white muddiness while achieving anti-glare properties. Further, it is found out that an anti-glare film having a specific average space between the diffuser elements in addition to the above-mentioned diffuse reflection characteristics has reduced rough surface appearance.

In a second embodiment of the present application, an example is described in which fine irregularities is formed in the surface due to convection caused in the resin containing fine particles, but a resin containing no fine particles can be used as long as Benard Cells are formed in the resin due to convection.

In a third embodiment of the present application, an example is described in which the anti-glare film is used in a liquid crystal display, but the display device is not limited to a liquid crystal display, and the anti-glare film may be applied to various display devices, such as a plasma display, an electroluminescence display, and a cathode ray tube (CRT) display.

In first and third embodiments of the present application, an example is described in which fine irregularities is formed in the surface of the anti-glare film by a shape transfer method, but an irregularities may be formed in the surface by, for example, subjecting the surface of a substrate to treatment by a sandblasting method, a laser beam machining method, a wet etching method, or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anti-glare film, comprising:
a substrate; and
an anti-glare layer formed on the substrate,
wherein the anti-glare layer has diffuser elements thereon,
the diffuser elements on the anti-glare layer are formed by applying a coating composition including organic fine particles on the substrate and causing convection in the coating composition so that the fine particles are agglomerated in the in-plane direction,
the fine particles have an average particle diameter ranging from 4 μm to 15 μm, the anti-glare layer has a dried film thickness ranging from 4 μm to 15 μm, and the fine particles are coated by the coating composition,
the diffuser elements have an average space therebetween of 50 μm to 300 μm,
wherein the anti-glare film has the following optical properties of:
a full width of angle of 10.0° to 45.0° at the $1/1,000$ reflected light intensity to a peak of a reflected light intensity, with respect to an incident light upon the surface having the plurality of diffuser elements thereon at an angle of 5° to 30° from the normal direction of the surface, and
a gain of 0.02 or less of a light reflected in the direction at 20° or more from the specular reflection direction of the incident light, the gain being obtained by normalizing a reflected light intensity using a specular reflection intensity of a standard diffuse plate as 1.

2. A method for manufacturing an anti-glare film, the method comprising the steps of:
applying a coating composition including organic fine particles on a substrate; and
drying the applied coating composition so that convection is caused in the coating composition, the convection causes the fine particles are agglomerated, and diffuser elements are formed thereon,
wherein the fine particles have an average particle diameter ranging from 4 μm to 15 μm, the anti-glare layer has a dried film thickness ranging from 4 μm to 15 μm, and the fine particles are coated by the coating composition,
the diffuser elements have an average space therebetween of 50 μm to 300 μm,
wherein the anti-glare film has the following optical properties of:
a full width of angle of 10.0° to 45.0° at the $1/1,000$ reflected light intensity to a peak of a reflected light intensity, with respect to an incident light upon the surface having the plurality of diffuser elements thereon at an angle of 5° to 30° from the normal direction of the surface, and
a gain of 0.02 or less of a light reflected in the direction at 20° or more from a specular reflection direction of the incident light, the gain being obtained by normalizing a reflected light intensity using a specular reflection intensity of a standard diffuse plate as 1.

3. A display device comprising:
a display portion for displaying an image; and
an anti-glare film formed on a display side of the display portion,
wherein the anti-glare film comprises:
a substrate; and
an anti-glare layer formed on the substrate,
wherein the anti-glare layer has diffuser elements thereon,
the diffuser elements on the anti-glare layer are formed by applying a coating composition including organic fine particles on the substrate and causing convection in the coating composition so that the fine particles are agglomerated in the in-plane direction,
the fine particles have an average particle diameter ranging from 4 μm to 15 μm, the anti-glare layer has a dried film thickness ranging from 4 μm to 15 μm, and the fine particles are coated by the coating composition,
the diffuser elements have an average space therebetween of 50 μm to 300 μm,
wherein the anti-glare film has the following optical properties of:
a full width of angle of 10.0° to 45.0° at the $1/1,000$ reflected light intensity to a peak of a reflected light intensity, with respect to an incident light upon the surface having the plurality of diffuser elements thereon at an angle of 5° to 30° from the normal direction of the surface, and
a gain of 0.02 or less of a light reflected in the direction at 20° or more from the specular reflection direction of the incident light, the gain being obtained by normalizing a reflected light intensity using a specular reflection intensity of a standard diffuse plate as 1.

* * * * *